(12) United States Patent
Mestres et al.

(10) Patent No.: US 11,709,754 B2
(45) Date of Patent: Jul. 25, 2023

(54) GENERATION, ADMINISTRATION AND ANALYSIS OF USER EXPERIENCE TESTING

(71) Applicant: USERZOOM TEHCNOLOGIES, INC., Dover, DE (US)

(72) Inventors: Xavier Mestres, Barcelona (ES); Alfonso de la Nuez, San Jose, CA (US); Albert Recolons, Barcelona (ES); Francesc del Castillo, Barcelona (ES); Jordi Ibañez, Barcelona (ES); Anna Barba, Barcelona (ES); Andrew Jensen, San Jose, CA (US)

(73) Assignee: USERZOOM TECHNOLOGIES, INC., Dover, DE (US)

( * ) Notice: Subject to any disclaimer, the term of this patent is extended or adjusted under 35 U.S.C. 154(b) by 0 days.

(21) Appl. No.: 17/379,786

(22) Filed: Jul. 19, 2021

(65) Prior Publication Data
US 2022/0004478 A1    Jan. 6, 2022

Related U.S. Application Data

(63) Continuation of application No. 16/730,954, filed on Dec. 30, 2019, now Pat. No. 11,068,374, which is a (Continued)

(51) Int. Cl.
*G06F 11/34* (2006.01)
*G06F 16/957* (2019.01)
(Continued)

(52) U.S. Cl.
CPC ...... *G06F 11/3438* (2013.01); *G06F 11/3409* (2013.01); *G06F 11/3684* (2013.01);
(Continued)

(58) Field of Classification Search
CPC .............. G06F 11/3438; G06F 16/685; G06F 11/3684; G06F 11/3688; G06F 11/3409;
(Continued)

(56) References Cited

U.S. PATENT DOCUMENTS

| 4,845,665 A | 7/1989 | Heath et al. |
| 5,086,393 A | 2/1992 | Kerr |

(Continued)

FOREIGN PATENT DOCUMENTS

| AU | 2015101408 | 11/2015 |
| WO | WO 2001024057 | 4/2001 |

OTHER PUBLICATIONS

User-Centred Library Websites: Usability Evaluation Methods by Carole George, Edition:2008.

(Continued)

*Primary Examiner* — Michael A Keller
(74) *Attorney, Agent, or Firm* — Kang S. Lim

(57) ABSTRACT

Systems and methods for generating, administering and analyzing a user experience study are provided. In particular, intents can be generated from a user experience study by applying one or more screener questions to participants and subjecting the screened participants to one or more tasks. Corresponding clickstreams and success data for each participant engaging in the tasks can be recorded. The success and clickstream data can also be aggregated for all the screened participants as aggregated results. Video data including audio for each of the screened participants can also be recorded.

20 Claims, 41 Drawing Sheets

Related U.S. Application Data continuation-in-part of application No. 16/163,913, filed on Oct. 18, 2018, now abandoned, and a continuation-in-part of application No. 13/112,792, filed on May 20, 2011, now Pat. No. 10,691,583.

(60) Provisional application No. 62/799,646, filed on Jan. 31, 2019, provisional application No. 61/348,431, filed on May 26, 2010.

(51) Int. Cl.

| | | |
|---|---|---|
| *G06F 16/783* | (2019.01) | |
| *G06Q 30/0601* | (2023.01) | |
| *G06Q 30/0203* | (2023.01) | |
| *G06F 16/683* | (2019.01) | |
| *G06F 11/36* | (2006.01) | |
| *G06Q 30/0217* | (2023.01) | |
| *G06Q 30/0207* | (2023.01) | |

(52) U.S. Cl.
CPC ........ *G06F 11/3688* (2013.01); *G06F 16/685* (2019.01); *G06F 16/7834* (2019.01); *G06F 16/7844* (2019.01); *G06F 16/957* (2019.01); *G06Q 30/0203* (2013.01); *G06Q 30/0217* (2013.01); *G06Q 30/0236* (2013.01); *G06Q 30/0623* (2013.01); *G06Q 30/0625* (2013.01); *G06Q 30/0629* (2013.01)

(58) Field of Classification Search
CPC .............. G06F 16/957; G06F 16/7844; G06F 16/7834; G06F 11/323; G06F 2201/865; G06F 11/3466; G06F 11/302; G06Q 30/0236; G06Q 30/0217; G06Q 30/0625; G06Q 30/0629; G06Q 30/0623; G06Q 30/0203

See application file for complete search history.

(56) References Cited

U.S. PATENT DOCUMENTS

| | | | |
|---|---|---|---|
| 5,220,658 | A | 6/1993 | Kerr |
| 5,724,262 | A | 3/1998 | Ghahramani |
| 5,808,908 | A | 9/1998 | Ghahramani |
| 6,237,138 | B1 | 5/2001 | Hameluck |
| 6,526,526 | B1 | 2/2003 | Dong |
| 6,738,082 | B1 | 5/2004 | Dong et al. |
| 6,859,784 | B1 | 2/2005 | van Duyne et al. |
| 6,895,437 | B1 | 5/2005 | Cowdrey |
| 7,222,078 | B2 | 5/2007 | Abelow |
| 7,433,874 | B1 | 10/2008 | Wolfe |
| 7,587,484 | B1 | 9/2009 | Smith |
| 7,941,525 | B1 | 5/2011 | Yavilevich |
| 8,892,543 | B1 | 11/2014 | Kapoor |
| 10,178,190 | B2 | 1/2019 | Qiao |
| 2001/0049084 | A1 | 12/2001 | Mitry |
| 2002/0143931 | A1 | 10/2002 | Smith |
| 2002/0178163 | A1 | 11/2002 | Mayer |
| 2002/0194053 | A1 | 12/2002 | Barrett |
| 2002/0196277 | A1 | 12/2002 | Bushey |
| 2003/0046057 | A1 | 3/2003 | Okunishi |
| 2004/0015867 | A1 | 1/2004 | Macko |
| 2004/0177002 | A1 | 9/2004 | Abelow |
| 2005/0254775 | A1 | 11/2005 | Hamilton |
| 2006/0184917 | A1 | 8/2006 | Troan |
| 2007/0106641 | A1 | 5/2007 | Chi |
| 2007/0209010 | A1 | 9/2007 | West |
| 2007/0233622 | A1 | 10/2007 | Willcok |
| 2007/0265910 | A1* | 11/2007 | Varghese ........... G06Q 30/0272 705/14.69 |
| 2008/0208682 | A1* | 8/2008 | Chandley .......... G06Q 30/0247 705/14.46 |
| 2008/0313149 | A1 | 12/2008 | Li |
| 2008/0313617 | A1 | 12/2008 | Zhu |
| 2008/0313633 | A1 | 12/2008 | Zhu |
| 2009/0138292 | A1 | 5/2009 | Dusi |
| 2009/0150724 | A1 | 6/2009 | Pramidi |
| 2009/0204573 | A1 | 8/2009 | Neuneier |
| 2009/0281819 | A1 | 11/2009 | Garg |
| 2009/0281852 | A1 | 11/2009 | Abhari et al. |
| 2010/0030792 | A1 | 2/2010 | Swinton et al. |
| 2010/0095208 | A1 | 4/2010 | White et al. |
| 2010/0251291 | A1 | 9/2010 | Pino, Jr. |
| 2011/0166884 | A1 | 7/2011 | Lesselroth |
| 2011/0314092 | A1 | 12/2011 | Lunt et al. |
| 2012/0078660 | A1 | 3/2012 | Mangicaro |
| 2012/0131476 | A1 | 5/2012 | Mestres |
| 2012/0210209 | A1 | 8/2012 | Biddle |
| 2012/0278388 | A1 | 11/2012 | Kleinbart |
| 2013/0132833 | A1 | 5/2013 | White |
| 2013/0254735 | A1 | 9/2013 | Sakhardande |
| 2014/0052853 | A1 | 2/2014 | Mestres et al. |
| 2014/0189054 | A1 | 7/2014 | Snider et al. |
| 2015/0269609 | A1* | 9/2015 | Mehanian .......... G06Q 30/0254 705/14.45 |
| 2016/0217481 | A1* | 7/2016 | Pastore ............. G06Q 30/0203 |
| 2017/0228745 | A1 | 8/2017 | Garcia et al. |

OTHER PUBLICATIONS

Richard Atterer, Monika Wnuk, and Albrecht Schmidt (Knowing the User's Every Move-User Activity Tracking for Website Usability Evaluation and Implicit Interaction, International World Wide Web Conference Committee, May 23-26, 2006, Edinburgh, Scotland). (Year:2006).

Jason I. Hong, Jeffrey Heer, Sarah Waterson, and James A. Landay (WebQuilt: a Proxy-based Approach to Remote Web Usability Testing, ACM Transactions on Information Systems, vol. 19, No. 3, Jul. 2001, pp. 263-285). (Year: 2001).

Non-Final Office Action for U.S. Appl. No. 13/112,792 dated Aug. 1, 2014, 41 pages.

ISA/US, "Notification of Transmittal of the ISR and the Written Opinion of the International Searching Authority, or the Declaration," in PCT Application No. PCT/US2020/012218, dated May 28, 2020, 9 pages.

European Patent Office, "Communication pursuant to Art. 153(7) EPC", in European Application No. 20747572.4, Sep. 20, 2022, 9 pages.

Desolda Guiseppe: "UTAssistant: a Web Platform Supporting Usability Testing in Italian Public Administrations", in DCPD@ CHItaly, Sep. 1, 2017 (Sep. 1, 2017), XP055959540, Retrieved from the Internet: URL:http://ceur-ws.org/Vol-1910/paper0209.pdf [retrieved on Sep. 9, 2022] * abstract * * p. 1-p. 4*.

Saqer Haneen et al: "Expanding the Usability Toolkit: Using PowerPoint(TM) to Perform Website Analysis and Testing", Proceedings of the Human Factors and Ergonomics Society Annual Meeting, val. 56, No. 1, Sep. 1, 2012 (Sep. 1, 2012), pp. 600-604, XP055959769, ISSN: 2169-5067, DO1: 10.1177/1071181312561125, Retrieved from the Internet: URL: http://journals.sagepub.com-doi/pdf/10.1177/1071181312561125> * p. 1* * p. 4-p. 5 *.

Lenin Nair: "How to Record Your Website Visitors & Their Actions With a Session Replay Tool", Aug. 16, 2018 (Aug. 16, 2018), XP055960089, Retrieved from the Internet: URL: https://web.archive.org/web/20180816194508/https://www.zoomowl.com/record-web-visitors-session-replay/ [retrieved on Sep. 12, 2022] * p. 1-p. 6 *.

* cited by examiner

| Username | Account settings | Support |

Unmoderated > Advanced > Desktop

HERE ARE YOUR PROJECT DETAILS

Project Type   Unmoderated - Advanced UX Research

Project Name (Internal)*

_____

Project Name (External)*

_____

Labels
_____

Goals / Notes

[                                     ]

Device Type
  Desktop

Tracking
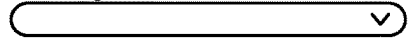

Participant Language

Privacy
  Shared

☐ Request Legal Consent (GDPR)

( Back )                              ( Create )

Definition   Participants   Task Builder

Username   Account settings   Support

LET'S SEE WHO WILL BE TAKING THIS STUDY

Let us find participants for you   Leverage IntelliZoom   Add segment

0 Available IntelliZoom Credits

*You Don't have any IntelliZoom segments yet.*

Recruit Your Own Users   You'll be able to invite them via email, QR code a[...]

*You Don't have any segments yet.*

> Let us find Participants for you
> Leverage IntelliZoom, select the criteria and number of participants and we'll get them for you
>
> Next Tip Request Support Participants Screener

Fig. 17

Username

SCREENER

Get the right Memb
You can use a s
There are two w
Reuse a particip

Keep in mind tha
Read this article

Screener Group

| Group |
|---|
| G1 |

Attention
Participants tha

Request Support

Participants

Screener

Advanced Screener
- Conditions
- Groups

How it works

---

NEW QUESTION — 1900

Question Type [ v ]

Question Text

Randomization options
- ● None
- ○ All the Answers
- ○ From [ v ] to [ v ]

Pinging Code: CKA29KD38        Export Name: CKA

| Answers | Insert all Answers at once | Save and Edit Logic |
|---|---|---|
| A1 | | Next |
| A2 | | Next |
| A3 | | Next |
| A4 | | Next |
| A5 | | Next |

( Cancel )  ( Save )

Username  Support

TASK 1: NAVIGATION INTERCEPT QUESTIONNAIRE   Add Question

This Questionn...

Page View

ADD TASK

What type of task to add? (Navigation task ˅)

Options
● Create new Naviagtion task
○ Copy an existing Navigation task from present project
  (Select existing task ˅)
○ Copy an existing Navigation task from another project
  (Select existing task ˅) (Select Project ˅)

Where would you like to place it?
● Right after last task
○ The first
○ After (Select Place ˅)

(Cancel) (Save)

2200

(Add Task)
Welcome Page
Instructions
Initial Questionnaire
Task 1: Nav
Pre-Task Question
Task Setting & Valid
Intercept
Validation
Success
Non-Success
General Question
Final Questionnaire
Final Pages & redirect

Fig. 22

Username | Support

LIST SELECTION AND QUANTITY

Project Details | Participants & Screening | Task Builder | Monitor | Results

Project Monitor
Project ID: CKD423
Type: Basic Usability
Video Recording:
Enabled
Owner: John Doe
Privacy: Shared Clear   Delete

Summary
Status: Closed
Created: 1/7/2019
Launched: 15 days
Active: 0
Completes: 15
Videos: 0
Median Time: 8 min
ScreenOuts: 7
Exclusions: 0

View Participants

2400

Project Monitor    ( Test )    ( Launch )

| Project Content | All Participants | % | IZ1 | S1 | Testers |
|---|---|---|---|---|---|
| Screener | 24 | 100% | -7 | 24 | 1 |
| Welcome page | 24 | 100% | -2 | 24 | 1 |
| Initial Questionnaire | 15 | 62% | 0 | 15 | 1 |
| > Task 1 | 15 | 62% | 0 | 15 | 1 |
| > Task 2 | 15 | 62% | 0 | 15 | 1 |
| Final Questionnaire | 15 | 62% | 0 | 15 | 1 |
| Complete | 15/25 | 62% | 0/10 | 15/15 | 1 |

Username     Support

LIST SELECTION AND QUANTITY

2500D

Project Monitor
IntelliZoom Criteria
1. Location
2. Age
3. Gender
4. Income
Screener
1. Question 1
2. Question 2
Initial Questionnaire
1. Question 3
2. Question 4
Tasks
Task Summary
Task 1
Success & efficiency
Task 2
Success & efficiency
Final Questionnaire
1. Question 5
2. Question 6

Initial Questionnaire

1. What is your age?     (customize ∨) (Export ∨)

18-25
  26-40
  41-50
  51-65
  0%  25%  50%  75%  100%

2. What state do you live in?    (customize ∨) (Export ∨)

Alabama
  Alaska
  California

Fig. 25D

Username

LIST SELECTION AND QUANTITY

2600

🔍

Clips
  Clips gallery
  Videos
  Session Replay
  Video Questions

Filters
>Tasks
>Marks
∨ Effectiveness
    All
    Success
    Abandon
    Error
    Timeout
>Camera
∨ Audio
    All
    With Audio
    Without Audio
>Viewed
>Clipped
>Availability Session Replay Search _____

| UZ ID | Segment | Information | Task | Effectiveness | Actions | Select Action ∨ | Apply |
|-------|---------|-------------|------|---------------|---------|-----------------|-------|
|       |         |             |      |               | Duration | Date | Actions |
|       |         |  No Data    |      |               |         |                 |       |

Apparel
Polo shirts
T-shirts
Jackets
Caps and Hats
Hoodies
Long Sleeve
Dress Shirts
View all

Toys, Games and Outdoor
Blankets
Sunglasses
Umbrellas
Toys
Towels
Frisbees
Chairs
Signs and Display
View all Picture 5

Picture 6

Drinkware
Coffee Mugs
Sports bottles
Plastic Tumblers
Glassware
Travel mugs
Can coolers
Stadium Cups
Coasters
View all Here's Where Users clicked

Misc.
Ornaments
Food and beverage
Kitchen items
Pet supplies
Health and wellness
Clocks
Tools
View all Picture 3

Picture 4

Bags and Backpacks
Tote Bags
Drawstring bags
Backpacks
Shopping bags
Duffel Bags
Messenger bags
Lunch bags
Briefcases
View all

Office Supplies
Pens
Sticky notes
Portfolios
Notebooks
USB flash drives
Lanyards
Calendars
Desk Accessories
View all Picture 1

Picture 2

OUR PROMISE TO YOU

LOWEST   FAST   NEW   FREE

OUR PRODUCTS

Picture 1

Bags and Backpacks
Tote Bags
Drawstring bags
Backpacks
Shopping bags
Duffel Bags
Messenger bags
Lunch bags
Briefcases
View all Picture 3

Drinkware
Coffee Mugs
Sports bottles
Plastic Tumblers
Glassware
Travel mugs
Can coolers
Stadium Cups
Coasters
View all Picture 5

Apparel
Polo shirts
T-shirts
Jackets
Caps and Hats
Hoodies
Long Sleeve
Dress Shirts
View all Picture 2

Office Supplies
Pens
Sticky notes
Portfolios
Notebooks
USB flash drives
Lanyards
Calendars
Desk Accessories
View all Picture 4

Misc.
Ornaments
Keychains
Food and beverage
80% clicks
Pet supplies
Health and wellness
Clocks
Tools
View all Picture 6

Toys, Games and Outdoor
Blankets
Sunglasses
Umbrellas
Toys
Towels
Frisbees
Chairs
Signs and Display
View all

OUR PROMISE TO YOU

LOWEST       FAST       NEW       FREE

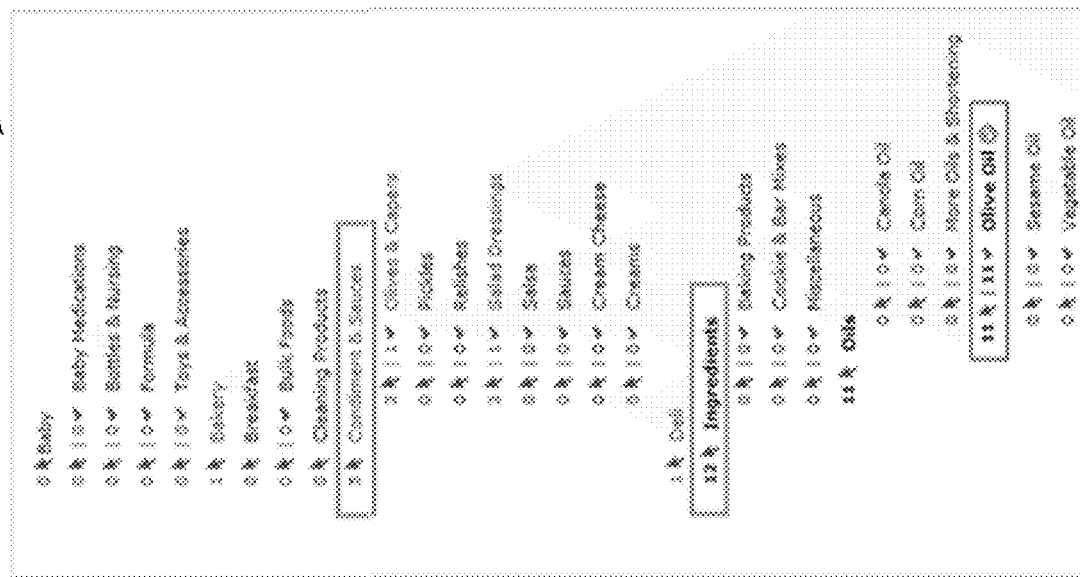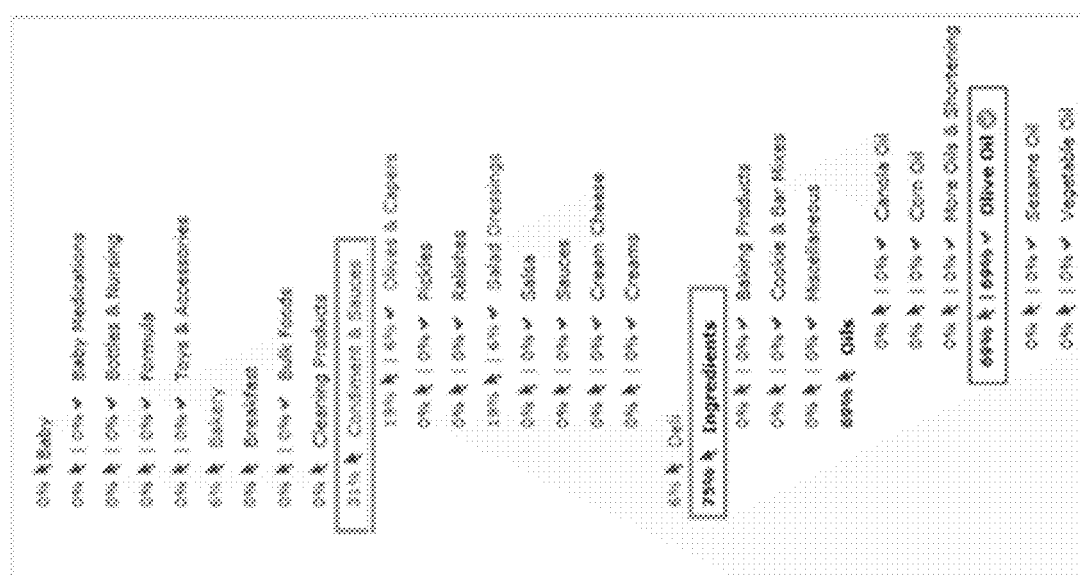
Fig. 28B

GENERATION, ADMINISTRATION AND ANALYSIS OF USER EXPERIENCE TESTING

CROSS REFERENCE TO RELATED APPLICATIONS

This application is a Continuation Application of U.S. application Ser. No. 16/730,954, filed Dec. 30, 2019 of the same title, recently allowed, which is a Continuation-in-part Applications and is a non-provisional and claims the benefit of U.S. Provisional Application No. 62/799,646 of the title "Systems and Methods for the Generation, Administration and Analysis of User Experience Testing", filed Jan. 31, 2019.

Application Ser. No. 16/730,954 also claims the benefit of and is a Continuation-in-part Applications of U.S. application Ser. No. 13/112,792 entitled "System and Method for Unmoderated Remote User Testing and Card Sorting," filed May 20, 2011, now U.S. Pat. No. 10,691,583 issued Jun. 23, 2020, which claims the benefit U.S. Provisional Application No. 61/348,431 of the same title, filed May 26, 2010.

Application Ser. No. 16/730,954 additionally claims the benefit of and is a Continuation-in-part Applications of U.S. application Ser. No. 16/163,913 entitled "Unmoderated Remote User Testing and Card Sorting," filed Oct. 18, 2018.

All of the above-referenced applications and patents are incorporated herein in their entirety by this reference.

BACKGROUND

The present invention relates to systems and methods for the generation of studies that allow for insight generation for the usability of a website. Generally, this type of testing is referred to as "User Experience" or merely "UX" testing.

The Internet provides new opportunities for business entities to reach customers via web sites that promote and describe their products or services. Often, the appeal of a web site and its ease of use may affect a potential buyer's decision to purchase the product/service.

Especially as user experiences continue to improve and competition online becomes increasingly aggressive, the ease of use by a particular retailer's website may have a material impact upon sales performance. Unlike a physical shopping experience, there is minimal hurdles to a user going to a competitor for a similar service or good. Thus, in addition to traditional motivators (e.g., competitive pricing, return policies, brand reputation, etc.) the ease of a website to navigate is of paramount importance to a successful online presence.

As such, assessing the appeal, user friendliness, and effectiveness of a web site is of substantial value to marketing managers, web site designers and user experience specialists; however, this information is typically difficult to obtain. Focus groups are sometimes used to achieve this goal but the process is long, expensive and not reliable, in part, due to the size and demographics of the focus group that may not be representative of the target customer base.

In more recent years advances have been made in the automation and implementation of mass online surveys for collecting user feedback information. Typically these systems include survey questions, or potentially a task on a website followed by feedback requests. While such systems are useful in collecting some information regarding user experiences, the studies often suffer from biases in responses, and limited types of feedback collected.

It is therefore apparent that an urgent need exists for advancements in the generation, implementation and analysis of studies into user experiences. Such systems and methods allow for improvements in web site design, marketing and brand management.

SUMMARY

To achieve the foregoing and in accordance with the present invention, systems and methods for generating, administering and analyzing a user experience study. This enables the efficient generation of insights regarding the user experience so that the experience can be changed to improve the customer or user experience.

In some embodiments, the system and methods includes the selection of participants as either ones supplied by the user, or ones the system provides. The participants the system provides includes screening a large pool of participants by a set of basic metrics (age, gender and income) or by advanced query questions have branched answers. These screener questions may be nested to allow for various participant groups to be generated. After the participants are screened, they may be invited to join the study.

The study itself may be a card sorting exercise, survey, tree study, click test, basic navigation, or advanced recorded study. A click test generate a 'heat map' when the participant is shown a static image and prompted to undergo a task or asked a question. The location and speed the user clicks on the image is used to generate the heat map. The advanced recorded study can present the user with a survey, navigation task, or any other desired activity. The participant can be recorded (audio and/or video) for downstream analysis. For any navigation aspects of the study the participant's click flow can also be monitored and used to populate a click-flow branched chart.

Recordings may be processed for additional analysis. For example machine learning may analyze video for eye movements and/or emotion, for example. The analysis can also include transcribing the audio, synchronizing the transcription with the video recording, and allowing for automatic clip generation when portions of the transcription are selected. The transcriptions may also be searched by keyword, tagged/annotated and these annotations are likewise searchable.

All results, whether they be videos, survey results, click flows, heat maps, etc. may all be filterable across any participant feature or any study validation criteria. Validation criteria includes time taken to complete a given action, ending up at a particular URL (or class of URLs), based upon question answers, or any combination thereof. These criteria can be classified as either a successful completion of the study, or a failed attempt. Additionally, the validation criteria can also include a decision by the participant to abandon the study.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which:

FIGS. 14-24, 25A-25F, 26, 27A-27D, 28A-28B and 29 are example screenshots of some embodiments of the user experience testing system.

DETAILED DESCRIPTION

Figure 1A:
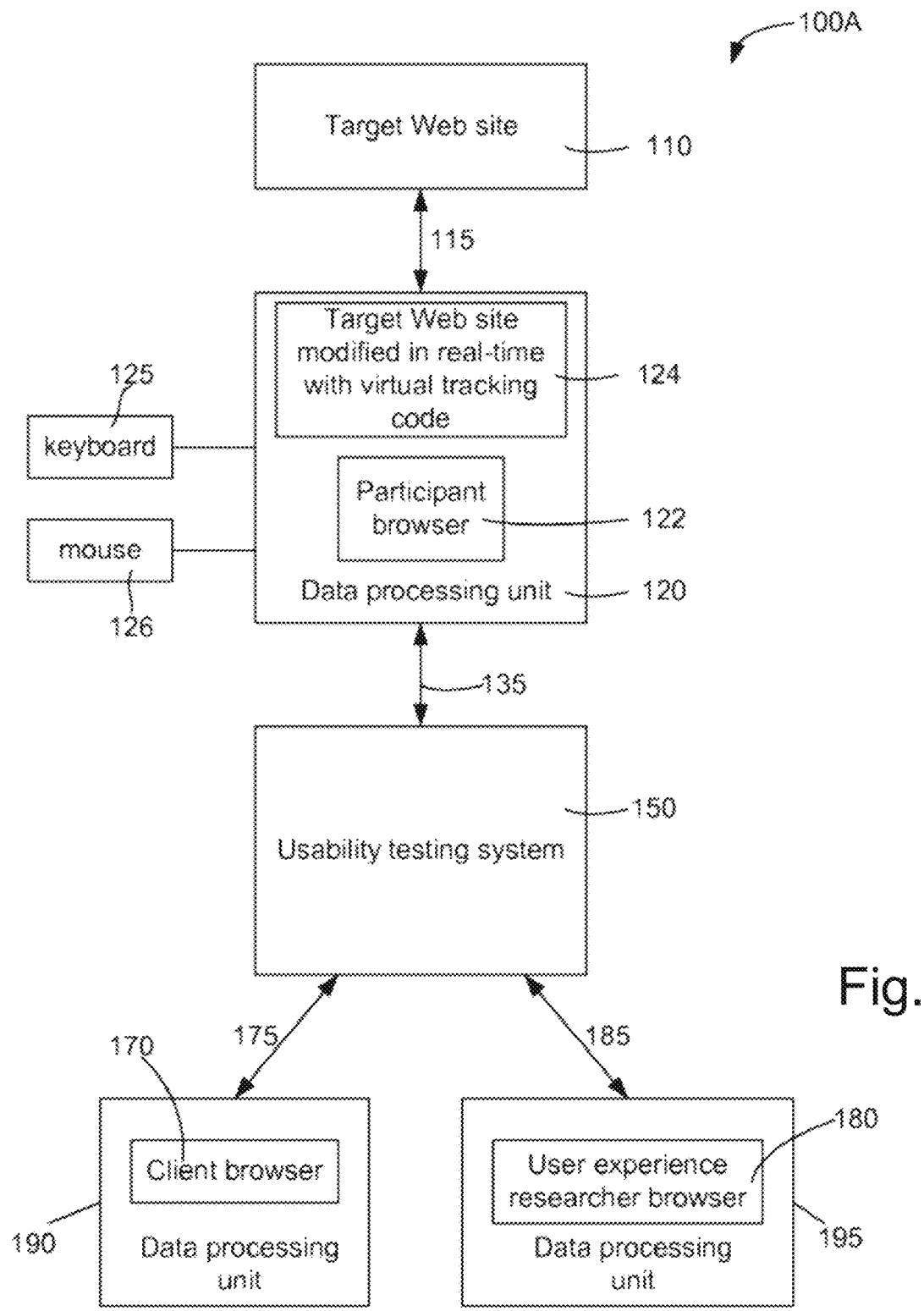
FIG. 1A is an example logical diagram of a system for user experience studies, in accordance with some embodiment.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

The present invention relates to enhancements to traditional user experience testing and subsequent insight generation. While such systems and methods may be utilized with any user experience environment, embodiments described in greater detail herein are directed to providing insights into user experiences in an online/webpage environment. Some descriptions of the present systems and methods will also focus nearly exclusively upon the user experience within a retailer's website. This is intentional in order to provide a clear use case and brevity to the disclosure, however it should be noted that the present systems and methods apply equally well to any situation where a user experience in an online platform is being studied. As such, the focus herein on a retail setting is in no way intended to artificially limit the scope of this disclosure.

The following description of some embodiments will be provided in relation to numerous subsections. The use of subsections, with headings, is intended to provide greater clarity and structure to the present invention. In no way are the subsections intended to limit or constrain the disclosure contained therein. Thus, disclosures in any one section are intended to apply to all other sections, as is applicable.

The following systems and methods are for improvements in natural language processing and actions taken in response to such message exchanges, within conversation systems, and for employment of domain specific assistant systems that leverage these enhanced natural language processing techniques. The goal of the message conversations is to enable a logical dialog exchange with a recipient, where the recipient is not necessarily aware that they are communicating with an automated machine as opposed to a human user. This may be most efficiently performed via a written dialog, such as email, text messaging, chat, etc. However, given the advancement in audio and video processing, it may be entirely possible to have the dialog include audio or video components as well.

In the following it is understood that the term usability refers to a metric scoring value for judging the ease of use of a target web site. A client refers to a sponsor who initiates and/or finances the usability study. The client may be, for example, a marketing manager who seeks to test the usability of a commercial web site for marketing (selling or advertising) certain products or services. Participants may be a selected group of people who participate in the usability study and may be screened based on a predetermined set of questions. Remote usability testing or remote usability study refers to testing or study in accordance with which participants (referred to use their computers, mobile devices or otherwise) access a target web site in order to provide feedback about the web site's ease of use, connection speed, and the level of satisfaction the participant experiences in using the web site. Unmoderated usability testing refers to communication with test participants without a moderator, e.g., a software, hardware, or a combined software/hardware system can automatically gather the participants' feedback and records their responses. The system can test a target web site by asking participants to view the web site, perform test tasks, and answer questions associated with the tasks.

To facilitate the discussion, FIG. 1A is a simplified block diagram of a user testing platform 100A according to an embodiment. Platform 100A is adapted to test a target web site 110. Platform 100A is shown as including a usability testing system 150 that is in communications with data processing units 120, 190 and 195. Data processing units 120, 190 and 195 may be a personal computer equipped with a monitor, a handheld device such as a tablet PC, an electronic notebook, a wearable device such as a cell phone, or a smart phone.

Data processing unit 120 includes a browser 122 that enables a user (e.g., usability test participant) using the data processing unit 120 to access target web site 110. Data processing unit 120 includes, in part, an input device such as a keyboard 125 or a mouse 126, and a participant browser 122. In one embodiment, data processing unit 120 may insert a virtual tracking code to target web site 110 in real-time while the target web site is being downloaded to the data processing unit 120. The virtual tracking code may be a proprietary JavaScript code, whereby the run-time data processing unit interprets the code for execution. The tracking code collects participants' activities on the downloaded web page such as the number of clicks, key strokes, keywords, scrolls, time on tasks, and the like over a period of time. Data processing unit 120 simulates the operations performed by the tracking code and is in communication with usability testing system 150 via a communication link 135. Communication link 135 may include a local area network, a metropolitan area network, and a wide area network. Such a communication link may be established through a physical wire or wirelessly. For example, the communication link may be established using an Internet protocol such as the TCP/IP protocol.

Activities of the participants associated with target web site 110 are collected and sent to usability testing system 150 via communication link 135. In one embodiment, data processing unit 120 may instruct a participant to perform predefined tasks on the downloaded web site during a usability test session, in which the participant evaluates the web site based on a series of usability tests. The virtual tracking code (e.g., a proprietary JavaScript) may record the participant's responses (such as the number of mouse clicks) and the time spent in performing the predefined tasks. The usability testing may also include gathering performance data of the target web site such as the ease of use, the connection speed, the satisfaction of the user experience. Because the web page is not modified on the original web site, but on the downloaded version in the participant data processing unit, the usability can be tested on any web sites including competitions' web sites.

Data collected by data processing unit 120 may be sent to the usability testing system 150 via communication link 135. In an embodiment, usability testing system 150 is further accessible by a client via a client browser 170 running on data processing unit 190. Usability testing system 150 is further accessible by user experience researcher browser 180 running on data processing unit 195. Client browser 170 is shown as being in communications with usability testing system 150 via communication link 175. User experience research browser 180 is shown as being in communications with usability testing system 150 via communications link 185. A client and/or user experience researcher may design one or more sets of questionnaires for screening participants and for testing the usability of a web site. Usability testing system 150 is described in detail below.

Figure 1B:
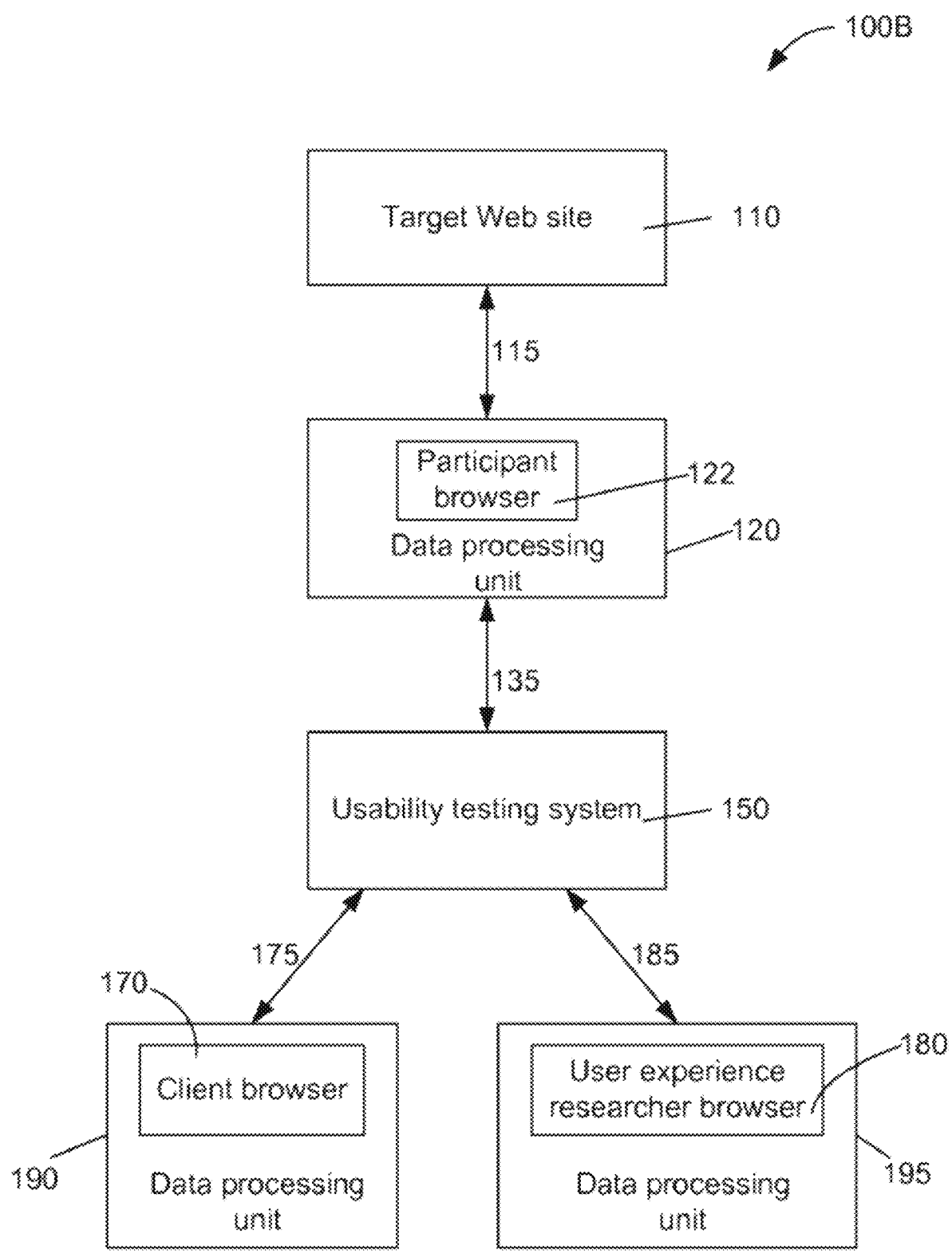
FIG. 1B is a second example logical diagram of a system for user experience studies, in accordance with some embodiment.

FIG. 1B is a simplified block diagram of a user testing platform 100B according to another embodiment of the present invention. Platform 100B is shown as including a target web site 110 being tested by one or more participants using a standard web browser 122 running on data processing unit 120 equipped with a display. Participants may communicate with a usability test system 150 via a communication link 135. Usability test system 150 may communicate with a client browser 170 running on a data processing unit 190. Likewise, usability test system 150 may communicate with user experience researcher browser running on data processing unit 195. Although a data processing unit is illustrated, one of skill in the art will appreciate that data processing unit 120 may include a configuration of multiple single-core or multi-core processors configured to process instructions, collect usability test data (e.g., number of clicks, mouse movements, time spent on each web page, connection speed, and the like), store and transmit the collected data to the usability testing system, and display graphical information to a participant via an input/output device (not shown).

Figure 1C:
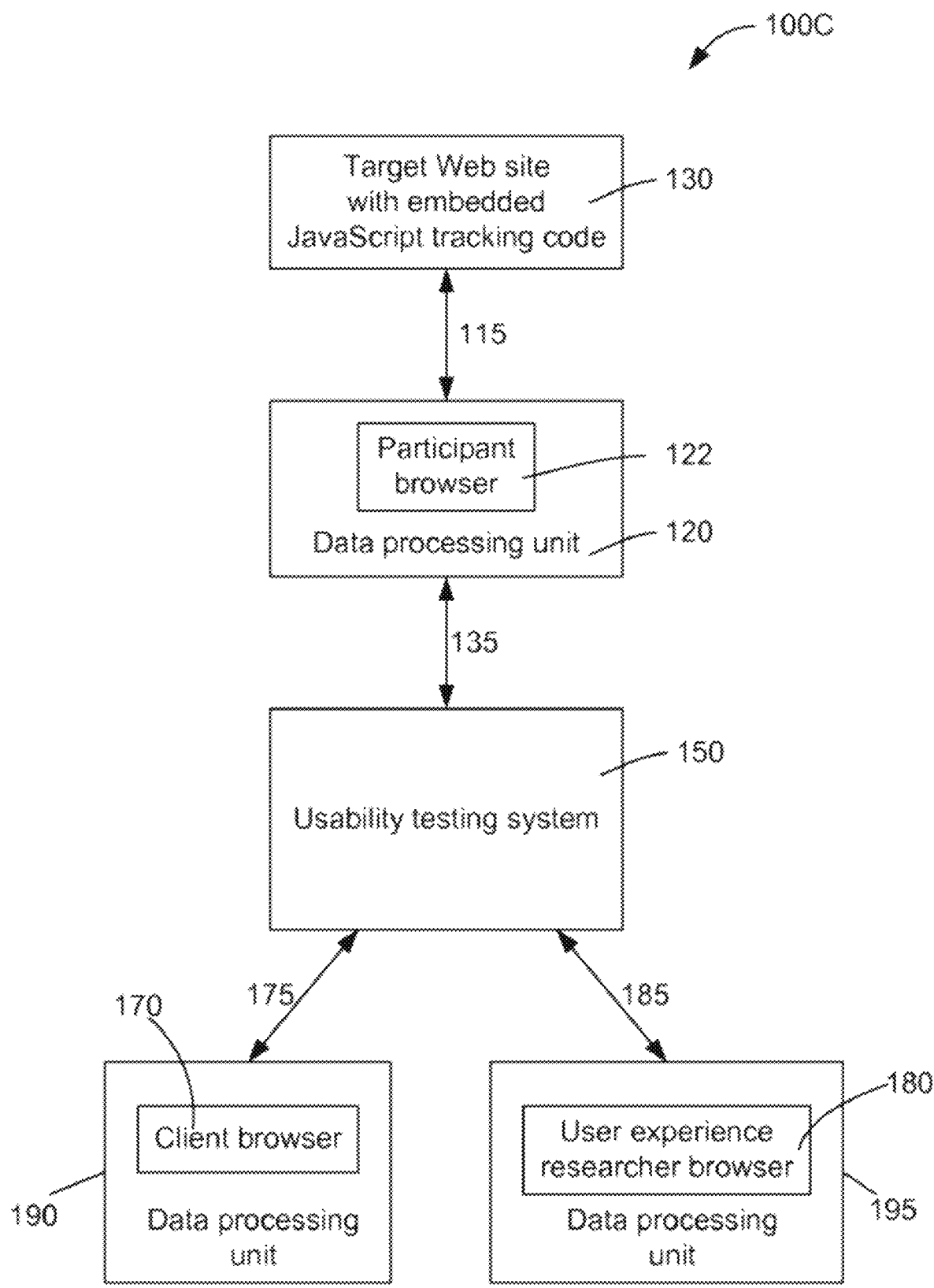
FIG. 1C is a third example logical diagram of a system for user experience studies, in accordance with some embodiment.

FIG. 1C is a simplified block diagram of a user testing platform 100C according to yet another embodiment of the present invention. Platform 100C is shown as including a target web site 130 being tested by one or more participants using a standard web browser 122 running on data processing unit 120 having a display. The target web site 130 is shown as including a tracking program code configured to track actions and responses of participants and send the tracked actions/responses back to the participant's data processing unit 120 through a communication link 115. Communication link 115 may be computer network, a virtual private network, a local area network, a metropolitan area network, a wide area network, and the like. In one embodiment, the tracking program is a JavaScript configured to run tasks related to usability testing and sending the test/study results back to participant's data processing unit for display. Such embodiments advantageously enable clients using client browser 170 as well as user experience researchers using user experience research browser 180 to design mockups or prototypes for usability testing of variety of web site layouts. Data processing unit 120 may collect data associated with the usability of the target web site and send the collected data to the usability testing system 150 via a communication link 135.

In one exemplary embodiment, the testing of the target web site (page) may provide data such as ease of access through the Internet, its attractiveness, ease of navigation, the speed with which it enables a user to complete a transaction, and the like. In another exemplary embodiment, the testing of the target web site provides data such as duration of usage, the number of keystrokes, the user's profile, and the like. It is understood that testing of a web site in accordance with embodiments of the present invention can provide other data and usability metrics. Information collected by the participant's data processing unit is uploaded to usability testing system 150 via communication link 135 for storage and analysis.

Figure 2:
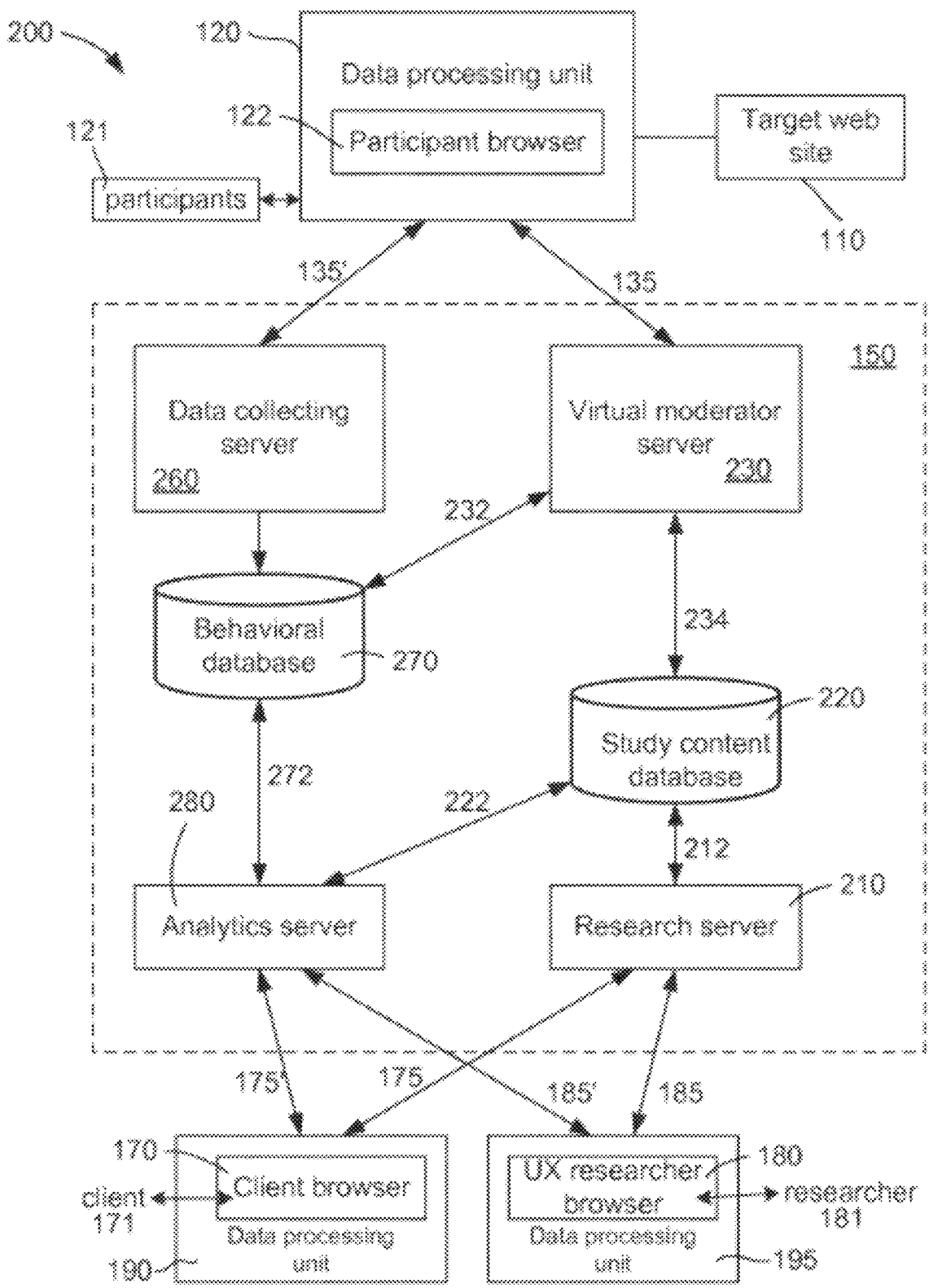
FIG. 2 is an example logical diagram of the usability testing system, in accordance with some embodiment.

FIG. 2 is a simplified block diagram of an exemplary embodiment platform 200 according to one embodiment of the present invention. Platform 200 is shown as including, in part, a usability testing system 150 being in communications with a data processing unit 125 via communications links 135 and 135'. Data processing unit 125 includes, in part, a participant browser 120 that enables a participant to access a target web site 110. Data processing unit 125 may be a personal computer, a handheld device, such as a cell phone, a smart phone or a tablet PC, or an electronic notebook. Data processing unit 125 may receive instructions and program codes from usability testing system 150 and display predefined tasks to participants 120. The instructions and program codes may include a web-based application that instructs participant browser 122 to access the target web site 110. In one embodiment, a tracking code is inserted to the target web site 110 that is being downloaded to data processing unit 125. The tracking code may be a JavaScript code that collects participants' activities on the downloaded target web site such as the number of clicks, key strokes, movements of the mouse, keywords, scrolls, time on tasks and the like performed over a period of time.

Data processing unit 125 may send the collected data to usability testing system 150 via communication link 135' which may be a local area network, a metropolitan area network, a wide area network, and the like and enable usability testing system 150 to establish communication with data processing unit 125 through a physical wire or wirelessly using a packet data protocol such as the TCP/IP protocol or a proprietary communication protocol.

Usability testing system 150 includes a virtual moderator software module running on a virtual moderator server 230 that conducts interactive usability testing with a usability test participant via data processing unit 125 and a research module running on a research server 210 that may be connected to a user research experience data processing unit 195. User experience researcher 181 may create tasks relevant to the usability study of a target web site and provide the created tasks to the research server 210 via a communication link 185. One of the tasks may be a set of questions designed to classify participants into different categories or to prescreen participants. Another task may be, for example, a set of questions to rate the usability of a target web site based on certain metrics such as ease of navigating the web site, connection speed, layout of the web page, ease of finding the products (e.g., the organization of product indexes). Yet another tasks may be a survey asking participants to press a "yes" or "no" button or write short comments about participants' experiences or familiarity with certain products and their satisfaction with the products. All these tasks can be stored in a study content database 220, which can be retrieved by the virtual moderator module running on virtual moderator server 230 to forward to participants 120. Research module running on research server 210 can also be accessed by a client (e.g., a sponsor of the usability test) 171 who, like user experience researchers 181, can design her own questionnaires since the client has a personal interest to the target web site under study. Client 171 can work together with user experience researchers 181 to create tasks for usability testing. In an embodiment, client 171 can modify tasks or lists of questions stored in the study content database 220. In another embodiment, client 171 can add or delete tasks or questionnaires in the study content database 220. In yet another embodiment, client 171 may be user experience researcher 181.

In some embodiment, one of the tasks may be open or closed card sorting studies for optimizing the architecture and layout of the target web site. Card sorting is a technique that shows how online users organize content in their own mind. In an open card sort, participants create their own names for the categories. In a closed card sort, participants are provided with a predetermined set of category names. Client 171 and/or user experience researcher 181 can create proprietary online card sorting tool that executes card sorting exercises over large groups of participants in a rapid and cost-effective manner. In an embodiment, the card sorting exercises may include up to 100 items to sort and up to 12 categories to group. One of the tasks may include categorization criteria such as asking participants questions "why do you group these items like this?." Research module on research server 210 may combine card sorting exercises and online questionnaire tools for detailed taxonomy analysis. In an embodiment, the card sorting studies are compatible with SPSS applications.

In an embodiment, the card sorting studies can be assigned randomly to participant 120. User experience (UX) researcher 181 and/or client 171 may decide how many of those card sorting studies each participant is required to complete. For example, user experience researcher 181 may create a card sorting study within 12 tasks, group them in 4 groups of 3 tasks and manage that each participant just has to complete one task of each group.

After presenting the thus created tasks to participants 120 through virtual moderator module (running on virtual moderator serer 230) and communication link 135, the actions/responses of participants will be collected in a data collecting module running on a data collecting server 260 via a communication link 135'. In an embodiment, communication link 135' may be a distributed computer network and share the same physical connection as communication link 135. This is, for example, the case where data collecting module 260 locates physically close to virtual moderator module 230, or if they share the usability testing system's processing hardware. In the following description, software modules running on associated hardware platforms will have the same reference numerals as their associated hardware platform. For example, virtual moderator module will be assigned the same reference numeral as the virtual moderator server 230, and likewise data collecting module will have the same reference numeral as the data collecting server 260.

Data collecting module 260 may include a sample quality control module that screens and validates the received responses, and eliminates participants who provide incorrect responses, or do not belong to a predetermined profile, or do not qualify for the study. Data collecting module 260 may include a "binning" module that is configured to classify the validated responses and stores them into corresponding categories in a behavioral database 270.

Merely as an example, responses may include gathered web site interaction events such as clicks, keywords, URLs, scrolls, time on task, navigation to other web pages, and the like. In one embodiment, virtual moderator server 230 has access to behavioral database 270 and uses the content of the behavioral database to interactively interface with participants 120. Based on data stored in the behavioral database, virtual moderator server 230 may direct participants to other pages of the target web site and further collect their interaction inputs in order to improve the quantity and quality of the collected data and also encourage participants' engagement. In one embodiment, virtual moderator server may eliminate one or more participants based on data collected in the behavioral database. This is the case if the one or more participants provide inputs that fail to meet a predetermined profile.

Usability testing system 150 further includes an analytics module 280 that is configured to provide analytics and reporting to queries coming from client 171 or user experience (UX) researcher 181. In an embodiment, analytics module 280 is running on a dedicated analytics server that offloads data processing tasks from traditional servers. Analytics server 280 is purpose-built for analytics and reporting and can run queries from client 171 and/or user experience researcher 181 much faster (e.g., 100 times faster) than conventional server system, regardless of the number of clients making queries or the complexity of queries. The purpose-built analytics server 280 is designed for rapid query processing and ad hoc analytics and can deliver higher performance at lower cost, and, thus provides a competitive advantage in the field of usability testing and reporting and allows a company such as UserZoom (or Xperience Consulting, SL) to get a jump start on its competitors.

In an embodiment, research module 210, virtual moderator module 230, data collecting module 260, and analytics server 280 are operated in respective dedicated servers to provide higher performance. Client (sponsor) 171 and/or user experience research 181 may receive usability test reports by accessing analytics server 280 via respective links 175' and/or 185'. Analytics server 280 may communicate with behavioral database via a two-way communication link 272.

In an embodiment, study content database 220 may include a hard disk storage or a disk array that is accessed via iSCSI or Fibre Channel over a storage area network. In an embodiment, the study content is provided to analytics server 280 via a link 222 so that analytics server 280 can retrieve the study content such as task descriptions, question texts, related answer texts, products by category, and the like, and generate together with the content of the behavioral database 270 comprehensive reports to client 171 and/or user experience researcher 181.

Shown in FIG. 2 is a connection 232 between virtual moderator server 230 and behavioral database 270. Behavioral database 270 can be a network attached storage server or a storage area network disk array that includes a two-way communication via link 232 with virtual moderator server 230. Behavioral database 270 is operative to support virtual moderator server 230 during the usability testing session. For example, some questions or tasks are interactively presented to the participants based on data collected. It would be advantageous to the user experience researcher to set up specific questions that enhance the usability testing if participants behave a certain way. If a participant decides to go to a certain web page during the study, the virtual moderator server 230 will pop up corresponding questions related to that page; and answers related to that page will be received and screened by data collecting server 260 and categorized in behavioral database server 270. In some embodiments, virtual moderator server 230 operates together with data stored in the behavioral database to proceed the next steps. Virtual moderator server, for example, may need to know whether a participant has successfully completed a task, or based on the data gathered in behavioral database 270, present another tasks to the participant.

Referring still to FIG. 2, client 171 and user experience researcher 181 may provide one or more sets of questions associated with a target web site to research server 210 via respective communication link 175 and 185. Research server 210 stores the provided sets of questions in a study content database 220 that may include a mass storage device, a hard disk storage or a disk array being in communication with research server 210 through a two-way interconnection link 212. The study content database may interface with virtual moderator server 230 through a communication link 234 and provides one or more sets of questions to participants via virtual moderator server 230.

Figure 3A:
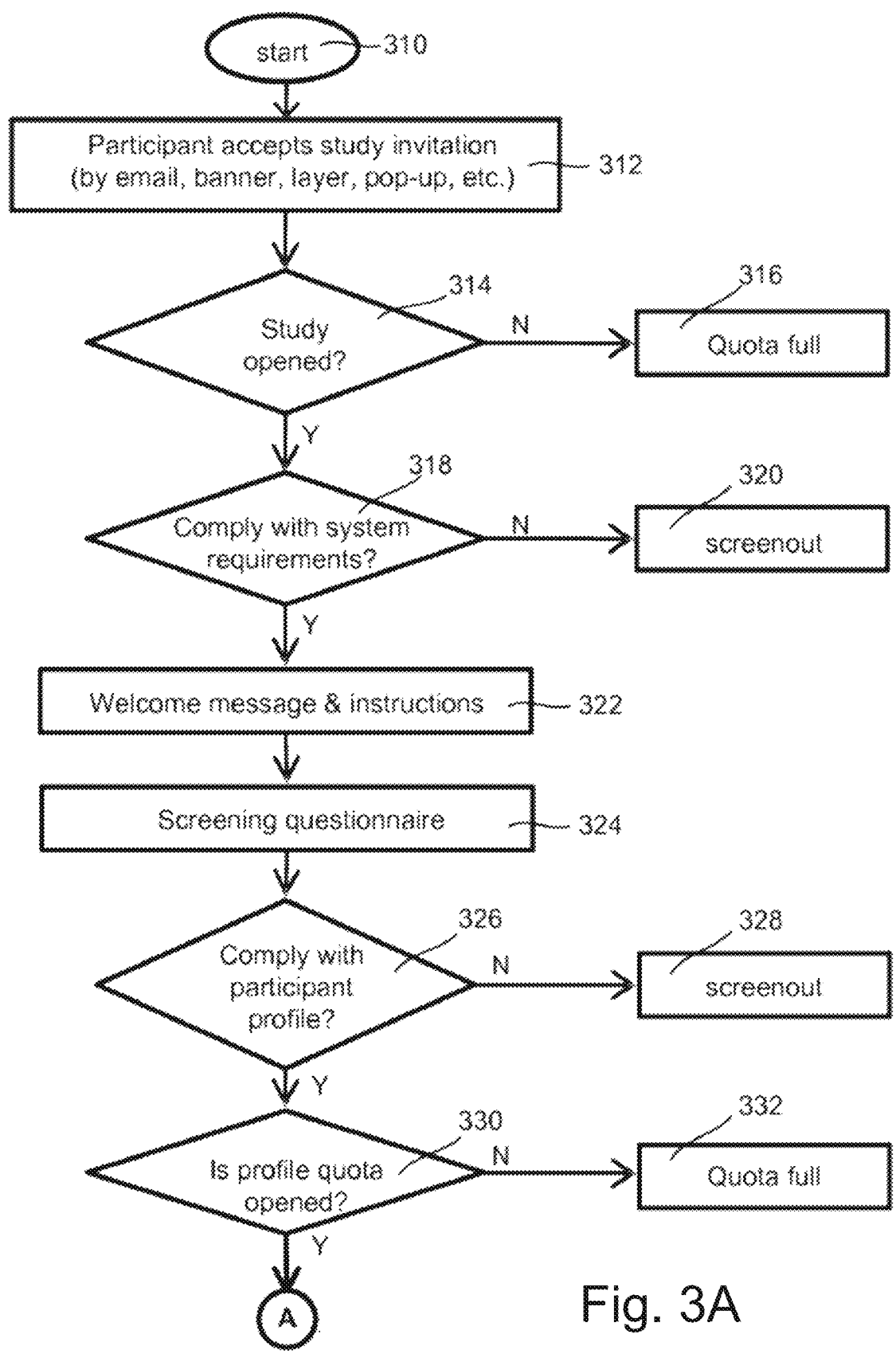
FIG. 3A is a flow diagram illustrating an exemplary process of interfacing with potential candidates and pre-screening participants for the usability testing according to an embodiment of the present invention.

FIG. 3A is a flow diagram of an exemplary process of interfacing with potential candidates and prescreening participants for the usability testing according to one embodiment of the present invention. The process starts at step 310. Initially, potential candidates for the usability testing may be recruited by email, advertisement banners, pop-ups, text layers, overlays, and the like (step 312). The number of candidates who have accepted the invitation to the usability test will be determined at step 314. If the number of candidates reaches a predetermined target number, then other candidates who have signed up late may be prompted with a message thanking for their interest and that they may be considered for a future survey (shown as "quota full" in step 316). At step 318, the usability testing system further determines whether the participants' browser comply with a target web site browser. For example, user experience researchers or the client may want to study and measure a web site's usability with regard to a specific web browser (e.g., Microsoft Edge) and reject all other browsers. Or in other cases, only the usability data of a web site related to Opera or Chrome will be collected, and Microsoft Edge or FireFox will be rejected at step 320. At step 322, participants will be prompted with a welcome message and instructions are presented to participants that, for example, explain how the usability testing will be performed, the rules to be followed, and the expected duration of the test, and the like. At step 324, one or more sets of screening questions may be presented to collect profile information of the participants. Questions may relate to participants' experience with certain products, their awareness with certain brand names, their gender, age, education level, income, online buying habits, and the like. At step 326, the system further eliminates participants based on the collected information data. For example, only participants who have used the products under study will be accepted or screened out (step 328). At step 330, a quota for participants having a target profile will be determined. For example, half of the participants must be female, and they must have online purchase experience or have purchased products online in recent years.

Figure 3B:
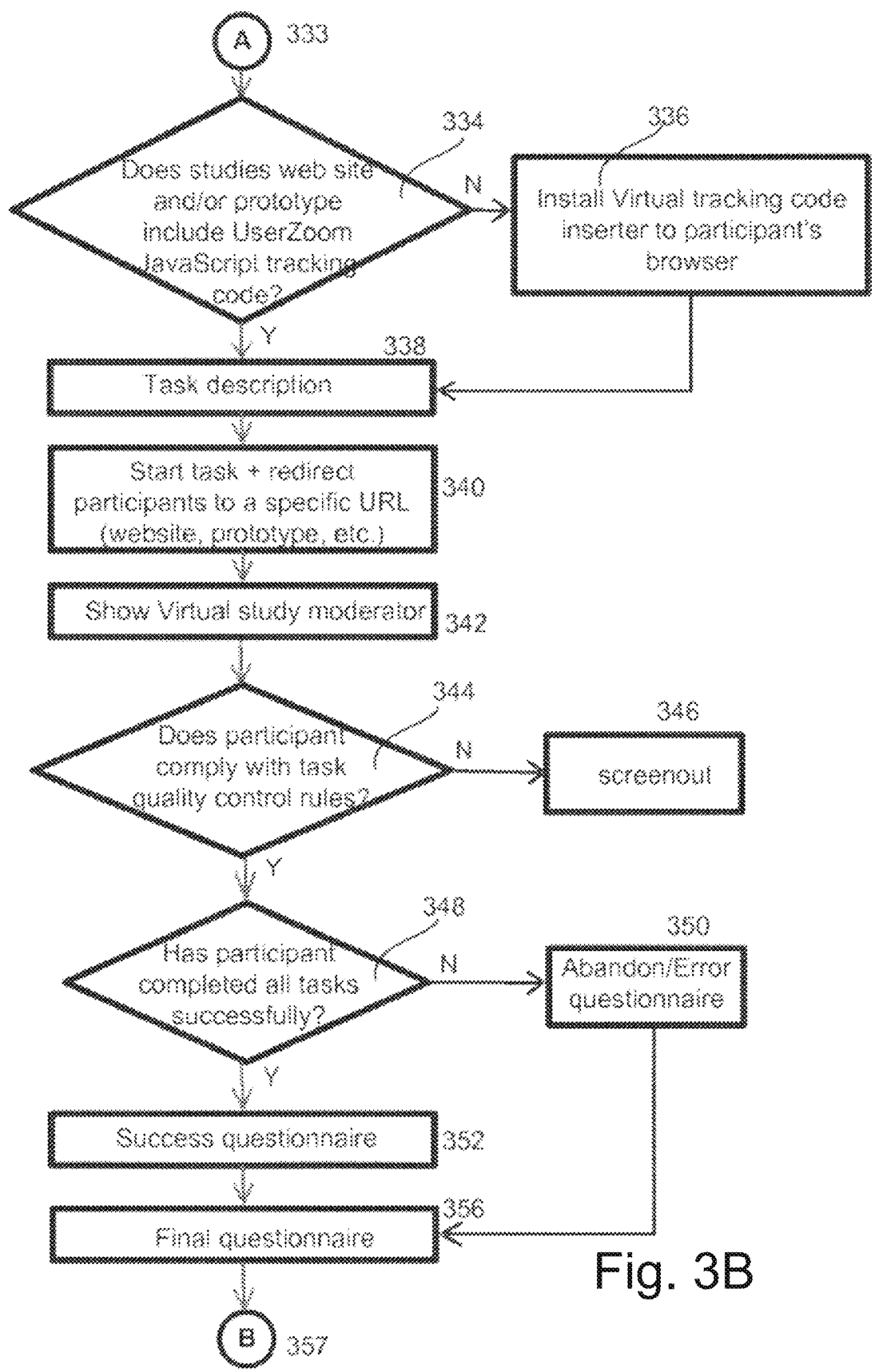
FIG. 3B is a flow diagram of an exemplary process for collecting usability data of a target web site according to an embodiment of the present invention.

FIG. 3B is a flow diagram of an exemplary process for gathering usability data of a target web site according to an embodiment of the present invention. At step 334, the target web site under test will be verified whether it includes a proprietary tracking code. In an embodiment, the tracking code is a UserZoom JavaScript code that pop-ups a series of tasks to the pre-screened participants. If the web site under study includes a proprietary tracking code (this corresponds to the scenario shown in FIG. 1C), then the process proceeds to step 338. Otherwise, a virtual tracking code will be inserted to participants' browser at step 336. This corresponds to the scenario described above in FIG. 1A.

The following process flow is best understood together with FIG. 2. At step 338, a task is described to participants. The task can be, for example, to ask participants to locate a color printer below a given price. At step 340, the task may redirect participants to a specific web site such as eBay, HP, or Amazon.com. The progress of each participant in performing the task is monitored by a virtual study moderator at step 342. At step 344, responses associated with the task are collected and verified against the task quality control rules. The step 344 may be performed by the data collecting module 260 described above and shown in FIG. 2. Data collecting module 260 ensures the quality of the received responses before storing them in a behavioral database 270 (FIG. 2). Behavioral database 270 may include data that the client and/or user experience researcher want to determine such as how many web pages a participant viewed before selecting a product, how long it took the participant to select the product and complete the purchase, how many mouse clicks and text entries were required to complete the purchase and the like. A number of participants may be screened out (step 346) during step 344 for non-complying with the task quality control rules and/or the number of participants may be required to go over a series of training provided by the virtual moderator module 230. At step 348, virtual moderator module 230 determines whether or not participants have completed all tasks successfully. If all tasks are completed successfully (e.g., participants were able to find a web page that contains the color printer under the given price), virtual moderator module 230 will prompt a success questionnaire to participants at step 352. If not, then virtual moderator module 230 will prompt an abandon or error questionnaire to participants who did not complete all tasks successfully to find out the causes that lead to the incompletion. Whether participants have completed all task successfully or not, they will be prompted a final questionnaire at step 356.

Figure 3C:
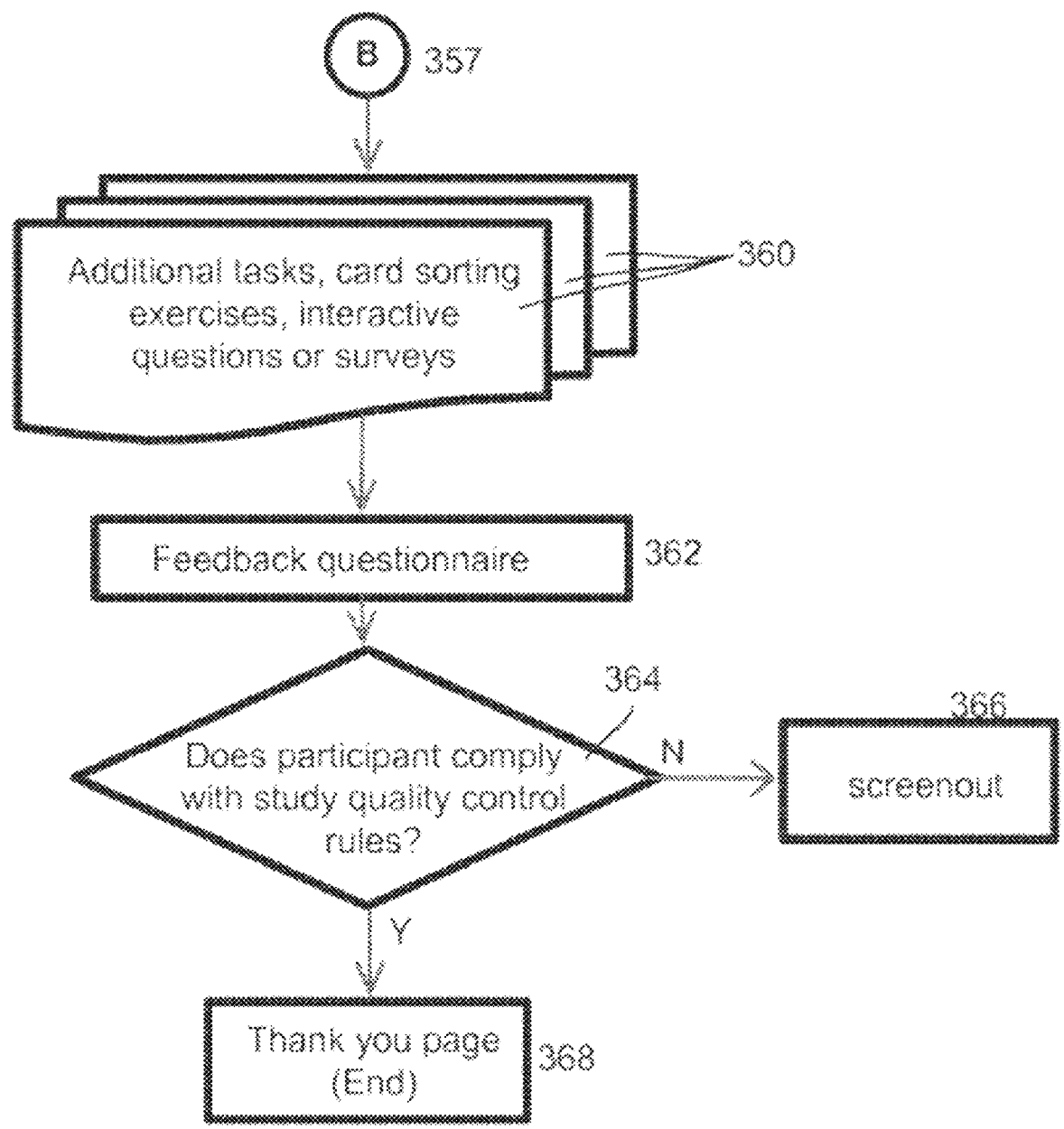
FIG. 3C is a flow diagram of an exemplary process for card sorting studies according to an embodiment of the present invention.

FIG. 3C is a flow diagram of an exemplary process for card sorting studies according to one embodiment of the present invention. At step 360, participants may be prompted with additional tasks such as card sorting exercises. Card sorting is a powerful technique for assessing how participants or visitors of a target web site group related concepts together based on the degree of similarity or a number of shared characteristics. Card sorting exercises may be time consuming. In an embodiment, participants will not be prompted all tasks but only a random number of tasks for the card sorting exercise. For example, a card sorting study is created within 12 tasks that is grouped in 6 groups of 2 tasks. Each participant just needs to complete one task of each group. It should be appreciated to one person of skill in the art that many variations, modifications, and alternatives are possible to randomize the card sorting exercise to save time and cost. Once the card sorting exercises are completed, participants are prompted with a questionnaire for feedback at step 362. The feedback questionnaire may include one or more survey questions such as a subjective rating of target web site attractiveness, how easy the product can be used, features that participants like or dislike, whether participants would recommend the products to others, and the like. At step 364, the results of the card sorting exercises will be analyzed against a set of quality control rules, and the qualified results will be stored in the behavioral database 270. In an embodiment, the analyze of the result of the card sorting exercise is performed by a dedicated analytics server 280 that provides much higher performance than general-purpose servers to provide higher satisfaction to clients. If participants complete all tasks successfully, then the process proceeds to step 368, where all participants will be thanked for their time and/or any reward may be paid out. Else, if participants do not comply or cannot complete the tasks successfully, the process proceeds to step 366 that eliminates the non-compliant participants.

Figure 4:
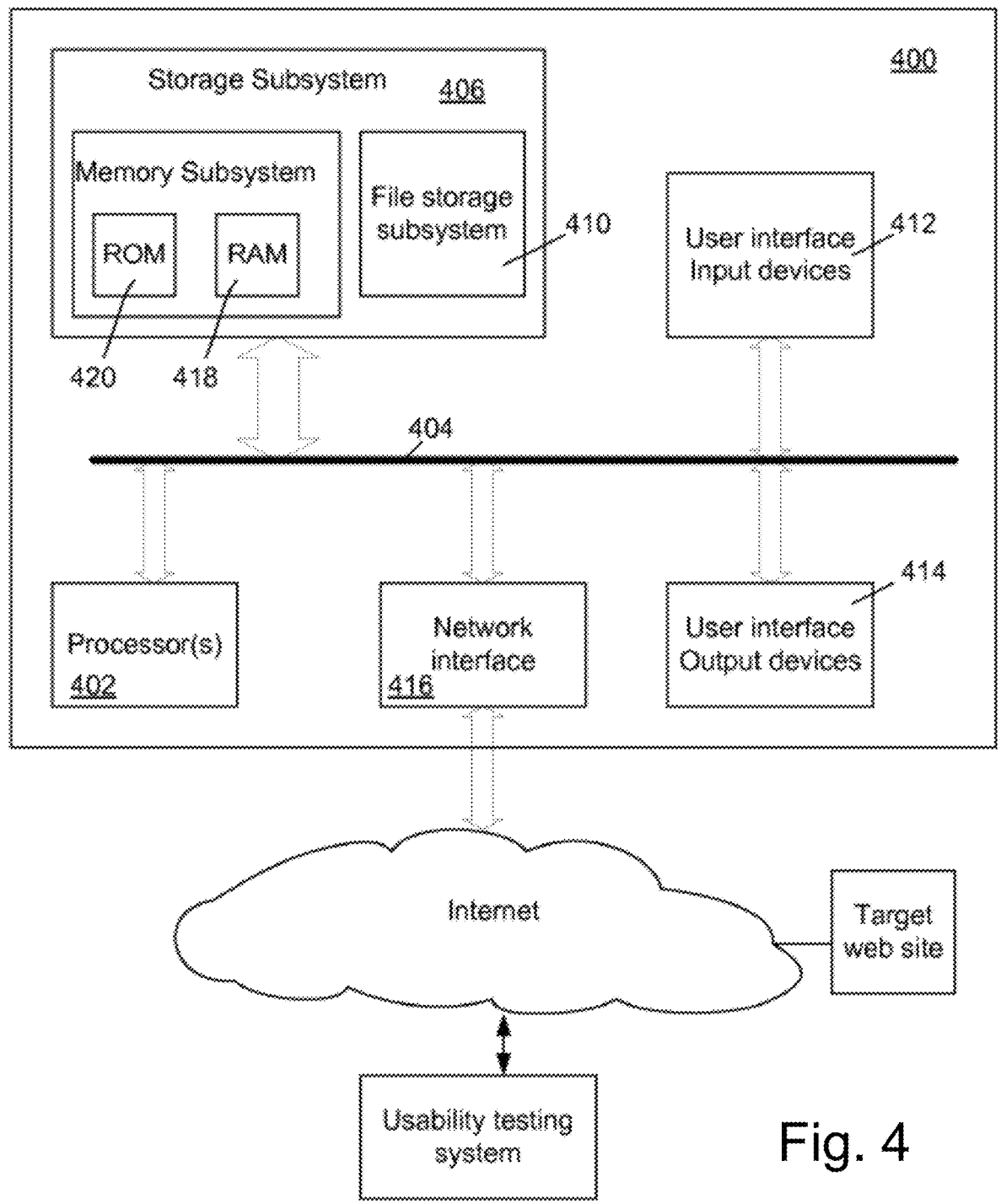
FIG. 4 is a simplified block diagram of a data processing unit configured to enable a participant to access a web site and track participant's interaction with the web site according to an embodiment of the present invention.

FIG. 4 illustrates an example of a suitable data processing unit 400 configured to connect to a target web site, display web pages, gather participant's responses related to the displayed web pages, interface with a usability testing system, and perform other tasks according to an embodiment of the present invention. System 400 is shown as including at least one processor 402, which communicates with a number of peripheral devices via a bus subsystem 404. These peripheral devices may include a storage subsystem 406, including, in part, a memory subsystem 408 and a file storage subsystem 410, user interface input devices 412, user interface output devices 414, and a network interface subsystem 416 that may include a wireless communication port. The input and output devices allow user interaction with data processing system 402. Bus system 404 may be any of a variety of bus architectures such as ISA bus, VESA bus, PCI bus and others. Bus subsystem 404 provides a mechanism for enabling the various components and subsystems of the processing device to communicate with each other. Although bus subsystem 404 is shown schematically as a single bus, alternative embodiments of the bus subsystem may utilize multiple busses.

User interface input devices 412 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term input device is intended to include all possible types of devices and ways to input information to processing device. User interface output devices 414 may include a display subsystem, a printer, a fax machine, or non-visual displays such as audio output devices. The display subsystem may be a cathode ray tube (CRT), a flat-panel device such as a liquid crystal display (LCD), or a projection device. In general, use of the term output device is intended to include all possible types of devices and ways to output information from the processing device.

Storage subsystem 406 may be configured to store the basic programming and data constructs that provide the functionality in accordance with embodiments of the present invention. For example, according to one embodiment of the present invention, software modules implementing the functionality of the present invention may be stored in storage subsystem 406. These software modules may be executed by processor(s) 402. Such software modules can include codes configured to access a target web site, codes configured to modify a downloaded copy of the target web site by inserting a tracking code, codes configured to display a list of predefined tasks to a participant, codes configured to gather participant's responses, and codes configured to cause participant to participate in card sorting exercises. Storage subsystem 406 may also include codes configured to transmit participant's responses to a usability testing system.

Memory subsystem 408 may include a number of memories including a main random access memory (RAM) 418 for storage of instructions and data during program execution and a read only memory (ROM) 420 in which fixed instructions are stored. File storage subsystem 410 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Figure 5:
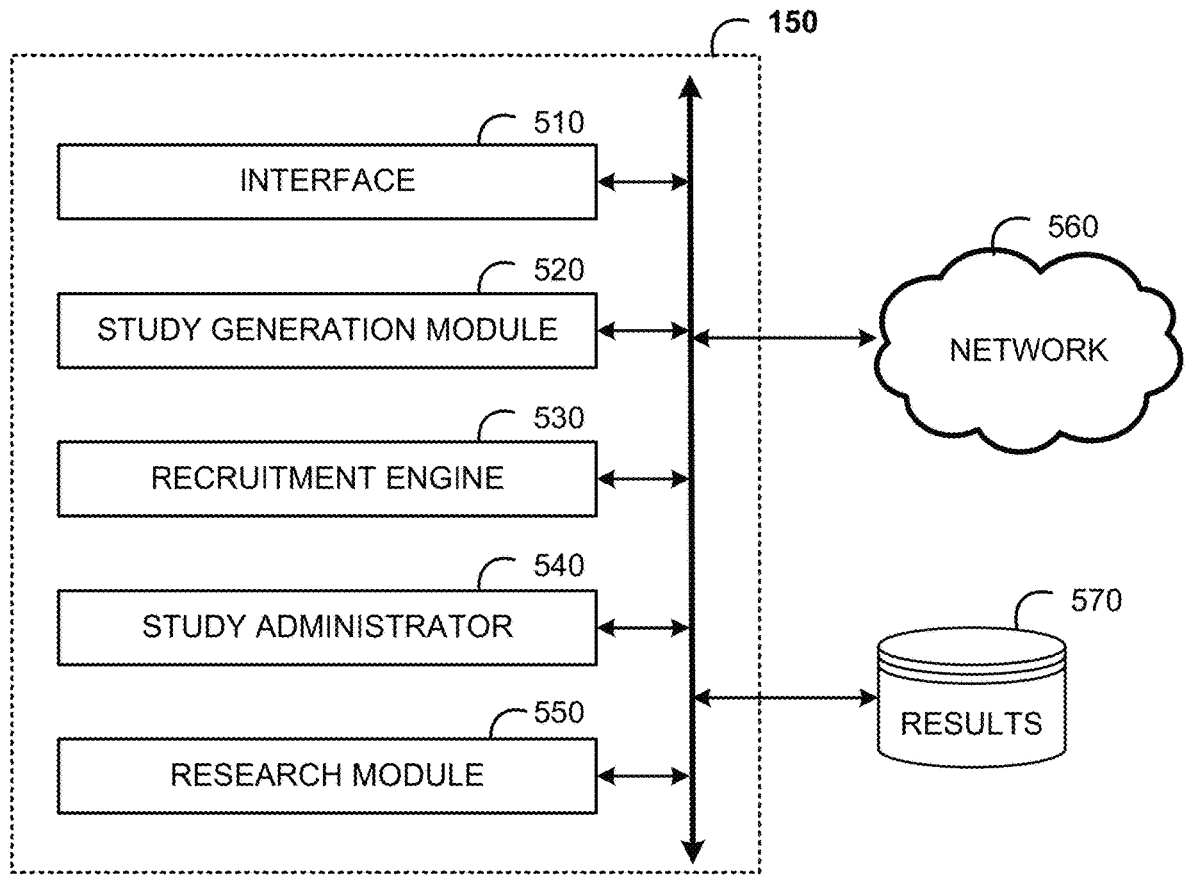
FIG. 5 is an example logical diagram of a second substantiation of the usability testing system, in accordance with some embodiment.

Now that systems and methods of usability testing have been described at a high level, attention will be directed to a particular set of embodiments of the systems and methods for user experience testing that allows for advanced insight generation. This begins with a usability testing system 150 as seen in relation to FIG. 5. In this substantiation of the usability testing system 150 a number of subcomponents are seen as logically connected with one another, including an interface 510 for accessing the results 570 which may be stored internally or in an external data repository. The interface is also configured to couple with the network 560, which most typically is the Internet, as previously discussed.

The other significant components of the user experience testing system 150 includes a study generation module 520, a recruitment engine 530, a study administrator 540 and a research module 550, each of which will be described in greater detail below. Each of the components of the user experience testing systems 150 may be physically or logically coupled, allowing for the output of any given component to be used by the other components as needed.

Figure 6:
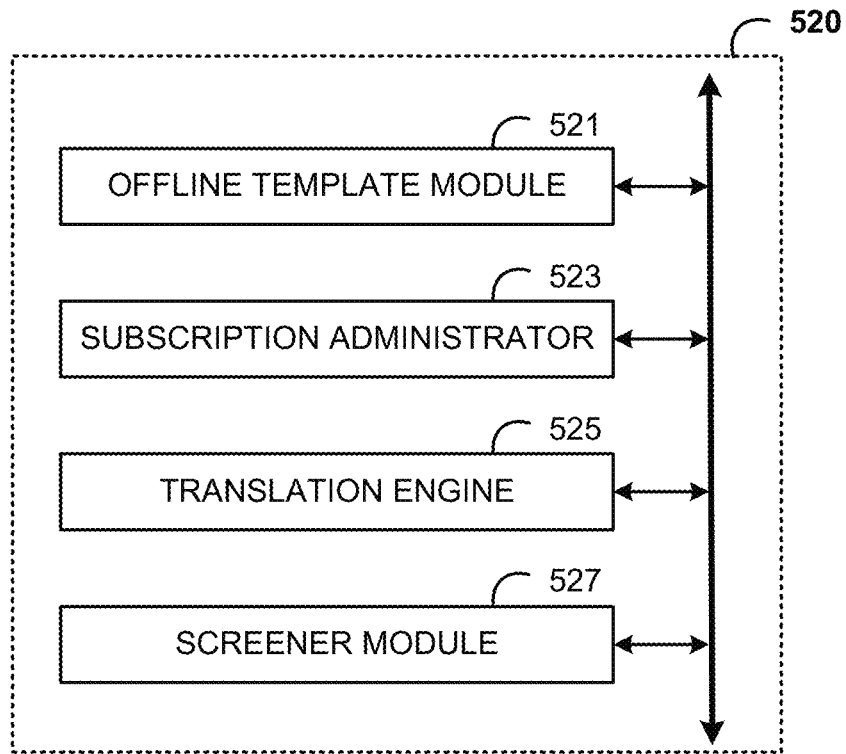
FIG. 6 is a logical diagram of the study generation module, in accordance with some embodiment.

Turning to FIG. 6, the study generation module 520 is provided in greater detail. An offline template module 521 provides a system user with templates in a variety of languages (pre-translated templates) for study generation, screener questions and the like, based upon study type. Users are able to save any screener question, study task, etc. for usage again at a later time or in another study.

In some embodiments a user may be able to concurrently design an unlimited number of studies, but is limited in the deployment of the studies due to the resource expenditure of participants and computational expense of the study insight generation. As such, a subscription administrator 523 manages the login credentialing, study access and deployment of the created studies for the user. In some embodiments, the user is able to have subscriptions that scale in pricing based upon the types of participants involved in a stud, and the number of studies concurrently deployable by the user/client.

The translation engine 525 may include machine translation services for study templates and even allow on the fly question translations. A screener module 527 is configured to allow for the generation of screener questions to weed through the participants to only those that are suited for the given study. This may include basic Boolean expressions with logical conditions to select a particular demographic for the study. However, the screener module 527 may also allow for advanced screener capabilities where screener groups and quotas are defined, allowing for advanced logical conditions to segment participants. For example, the study may wish to include a group of 20 women between the ages of 25-45 and a group of men who are between the ages of 40-50 as this may more accurately reflect the actual purchasing demographic for a particular retailer. A single participant screening would be unable to generate this mix of participants, so the advanced screener interface is utilized to ensure the participants selected meet the user's needs for the particular study.

Figure 7:
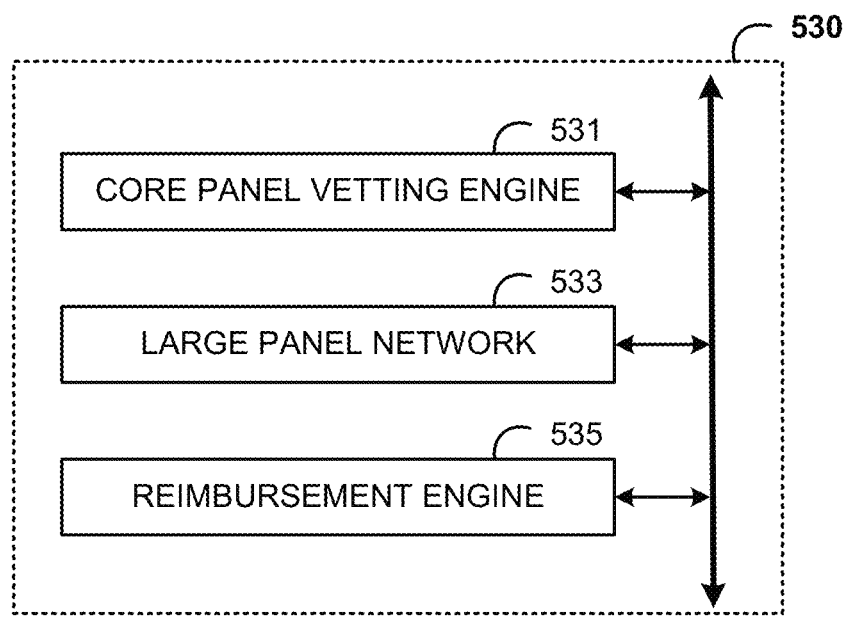
FIG. 7 is a logical diagram of the recruitment engine, in accordance with some embodiment.

Turning now to FIG. 7, a more detailed illustration of the recruitment engine 530 is provided. The recruitment engine 530 is responsible for the recruiting and management of participants for the studies. Generally, participants are one of three different classes: 1) core panel participants, 2) general panel participants, and 3) client provided participants. The core panel participants are compensated at a greater rate, but must first be vetted for their ability and willingness to provide comprehensive user experience reviews. Significant demographic and personal information can be collected for these core panel participants, which can enable powerful downstream analytics. The core panel vetting engine 531 collects public information automatically for the participants as well as eliciting information from the participant to determine if the individual is a reliable panelists. Traits like honesty and responsiveness may be ascertained by comparing the information derived from public sources to the participant supplied information. Additionally, the participant may provide a video sample of a study. This sample is reviewed for clarity and communication proficiency as part of the vetting process. If a participant is successfully vetted they are then added to a database of available core panelists. Core panelists have an expectation of reduced privacy, and may pre-commit to certain volumes and/or activities.

Beyond the core panel is a significantly larger pool of participants in a general panel participant pool. This pool of participants may have activities that they are unwilling to engage in (e.g., audio and video recording for example), and are required to provide less demographic and personal information than core panelists. In turn, the general panel participants are generally provided a lower compensation for their time than the core panelists. Additionally, the general panel participants may be a shared pooling of participants across many user experience and survey platforms. This enables a demographically rich and large pool of individuals to source from. A large panel network 533 manages this general panel participant pool.

Lastly, the user or client may already have a set of participants they wish to use in their testing. For example, if the user experience for an employee benefits portal is being tested, the client will wish to test the study on their own employees rather than the general public.

A reimbursement engine 535 is involved with compensating participants for their time (often on a per study basis). Different studies may be 'worth' differing amounts based upon the requirements (e.g., video recording, surveys, tasks, etc.) or the expected length to completion. Additionally, the compensation between general panelists and core panelists may differ even for the same study. Generally, client supplied participants are not compensated by the reimbursement engine 535 as the compensation (if any) is directly negotiated between the client and the participants.

Figure 8:
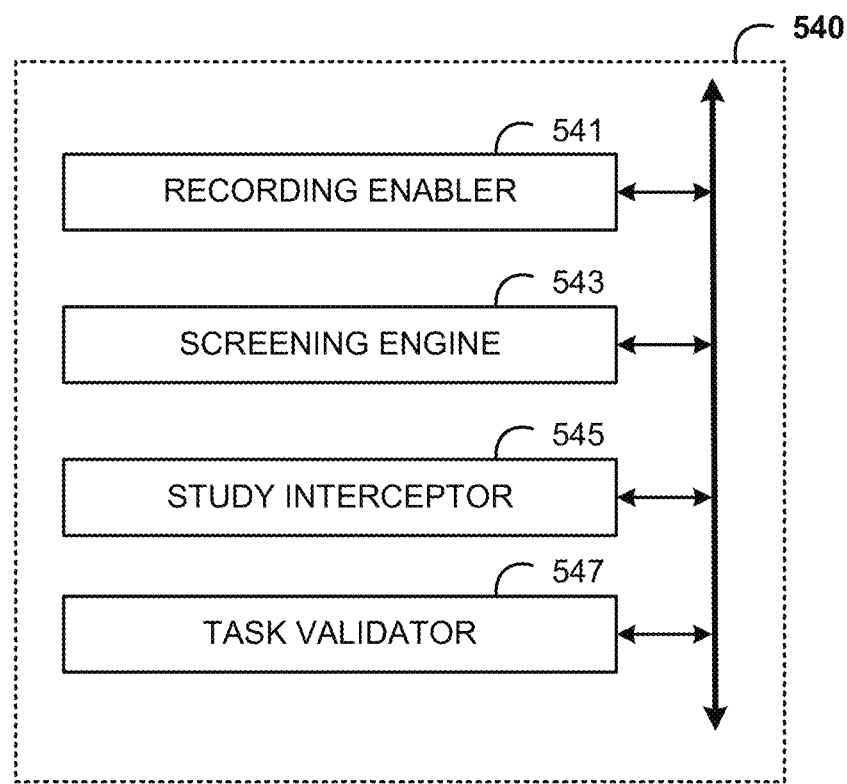
FIG. 8 is a logical diagram of the study administrator, in accordance with some embodiment.

Turning now to FIG. 8, a more detailed view of the study administrator 540 is provided. Unlike many other user experience testing programs, the presently disclosed systems and methods include the ability to record particular activities by the user. A recording enabler 541 allows for the collection of click-flow information, audio collection and even video recording. In the event of audio and/or video recording the recording only occurs during the study in order to preserve participant privacy, and to focus attention on only time periods that will provide insights into the user experience. Thus, while the participant is engaged in screening questions or other activities recording may be disabled to prevent needless data accumulation. Recording only occurs after user acceptance (to prevent running afoul of privacy laws and regulations), and during recording the user may be presented with a clear indication that the session is being recorded. For example the user may be provided a thumbnail image of the video capture, in some embodiments. This provides notice to the user of the video recording, and also indicates video quality and field of view information, thereby allowing them to readjust the camera if needed or take other necessary actions (avoiding harsh backlight, increasing ambient lighting, etc.).

The screening engine 543 administers the generated screener questions for the study. Screener questions, as previously disclosed, includes questions to the potential participants that may qualify or disqualify them from a particular study. For example, in a given study, the user may wish to target men between the ages of 21 and 35, for example. Questions regarding age and gender may be used in the screener questions to enable selection of the appropriate participants for the given study. Additionally, based upon the desired participant pool being used, the participants may be pre-screened by the system based upon known demographic data. For the vetted core panelists the amount of personal data known may be significant, thereby focusing in on eligible participants with little to no additional screener questions required. For the general panel population, however, less data is known, and often all but the most rudimentary qualifications may be performed automatically.

After this qualification filtering of the participants, they may be subjected to the screener questions as discussed above.

In some embodiments it may be desirable to interrupt a study in progress in order to interject a new concept, offer or instruction. Particularly, in a mobile application there can be a software developer kit (SDK) that enables the integration into the study and interruption of the user in-process. The study interceptor 545 manages this interruptive activity. Interruption of the user experience allows for immediate feedback testing or prompts to have the participant do some other activity. For example, the interrupt may be configured to trigger when some event or action is taken, such as the participant visiting a particular URL or meeting a determined threshold (e.g. having two items in their shopping cart). The interruption allows the participant to be either redirected to another parallel user experience, or be prompted to agree to engage in a study or asked to answer a survey or the like.

Lastly, the study may include one or more events to occur in order to validate its successful completion. A task validator 547 tracks these metrics for study completion. Generally, task validation falls into three categories: 1) completion of a particular action (such as arriving at a particular URL, URL containing a particular keyword, or the like), 2) completing a task within a time threshold (such as finding a product that meets criteria within a particular time limit), and 3) by question. Questions may include any definition of success the study designer deems relevant. This may include a simple "were you successful in the task?" style question, or a more complex satisfaction question with multiple gradient answers, for example.

Figure 9:
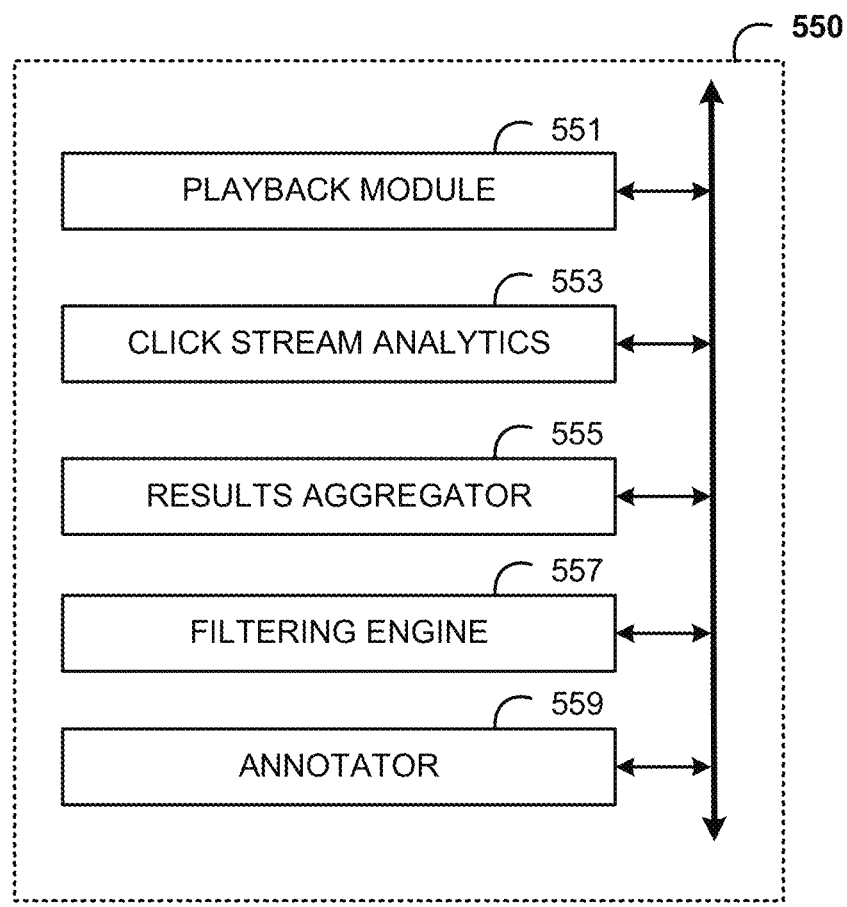
FIG. 9 is a logical diagram of the research module, in accordance with some embodiment.

Turning now to FIG. 9, the research module 550 is provided in greater detail. Compared to traditional user experience study platforms, the present systems and methods particularly excel at providing timely and accurate insights into a user's experience, due to these research tools. The research module includes basic functionalities, such as playback of any video or audio recordings by the playback module 551. This module, however, may also include a machine transcription of the audio, which is then time synchronized to the audio and/or video file. This allows a user to review and search the transcript (using keywords or the like) and immediately be taken to the relevant timing within the recording. And of the results may be annotated using an annotator 559 as well. This allows, for example the user to select a portion of the written transcription and provide an annotation relevant to the study results. The system then automatically can use the timing data to generate an edited video/audio clip associated with the annotation. If the user later searches the study results for the annotation, this auto-generated clip may be displayed for viewing.

In addition to the video and/or audio recordings, the clickstream for the participant is recorded and mapped out as a branched tree, by the click stream analyzer 553. This may be aggregated with other participants' results for the study, to provide the user an indication of what any specific participant does to complete the assigned task, or some aggregated group generally does. The results aggregator 555 likewise combines task validation findings into aggregate numbers for analysis.

All results may be searched and filtered by a filtering engine 557 based upon any delineator. For example, a user may desire to know what the pain points of a given task are, and thus filters the results only by participants that failed to complete the task. Trends in the clickstream for these individuals may illustrate common activities that result in failure to complete the task. For example, if the task is to find a laptop computer with a dedicated graphics card for under a set price, and the majority of people who fail to successfully complete this task end up stuck in computer components due to typing in a search for "graphics card" this may indicate that the search algorithm requires reworking to provide a wider set of categories of products, for example.

As noted above, the filtering may be by any known dimension (not simply success or failure events of a task). For example, during screening or as part of a survey attending the study, income levels, gender, education, age, shopping preferences, etc. may all be discovered. It is also possible that the participant pool includes some of this information in metadata associated with the participant as well. Any of this information may be used to drill down into the results filtering. For example it may be desired to filter for only participants over a certain age. If after a certain age success rates are found to drop off significantly, for example, it may be that the font sizing is too small, resulting in increased difficulty for people with deteriorating eyesight.

Likewise, any of the results may be subject to annotations. Annotations allow for different user reviewers to collectively aggregate insights that they develop by reviewing the results, and allows for filtering and searching for common events in the results.

All of the results activities are additionally ripe for machine learning analysis using deep learning. For example, the known demographic information may be fed into a recursive neural network (RNN) or convoluted neural network (CNN) to identify which features are predictive of a task being completed or not. Even more powerful is the ability for the clickstream to be fed as a feature set into the neural network to identify trends in click flow activity that are problematic or result in a decreased user experience.

Figure 10:
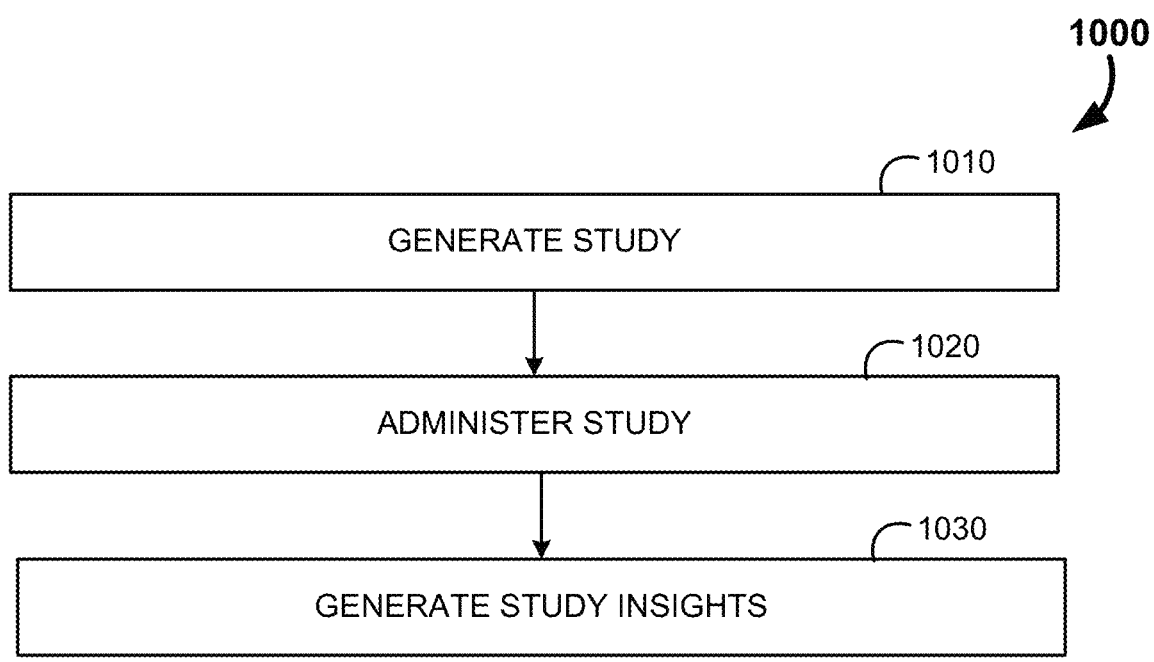
FIG. 10 is a flow diagram for an example process of user experience testing, in accordance with some embodiment.

Turning now to FIG. 10, a flow diagram of the process of user experience study testing is provided generally at 1000. At a high level this process includes three basic stages: the generation of the study (at 1010) the administration of the study (at 1020) and the generation of the study insights (at 1030). Earlier FIGS. 3A-C touched upon the study administration, and is intended to be considered one embodiment thereof.

Figure 11:
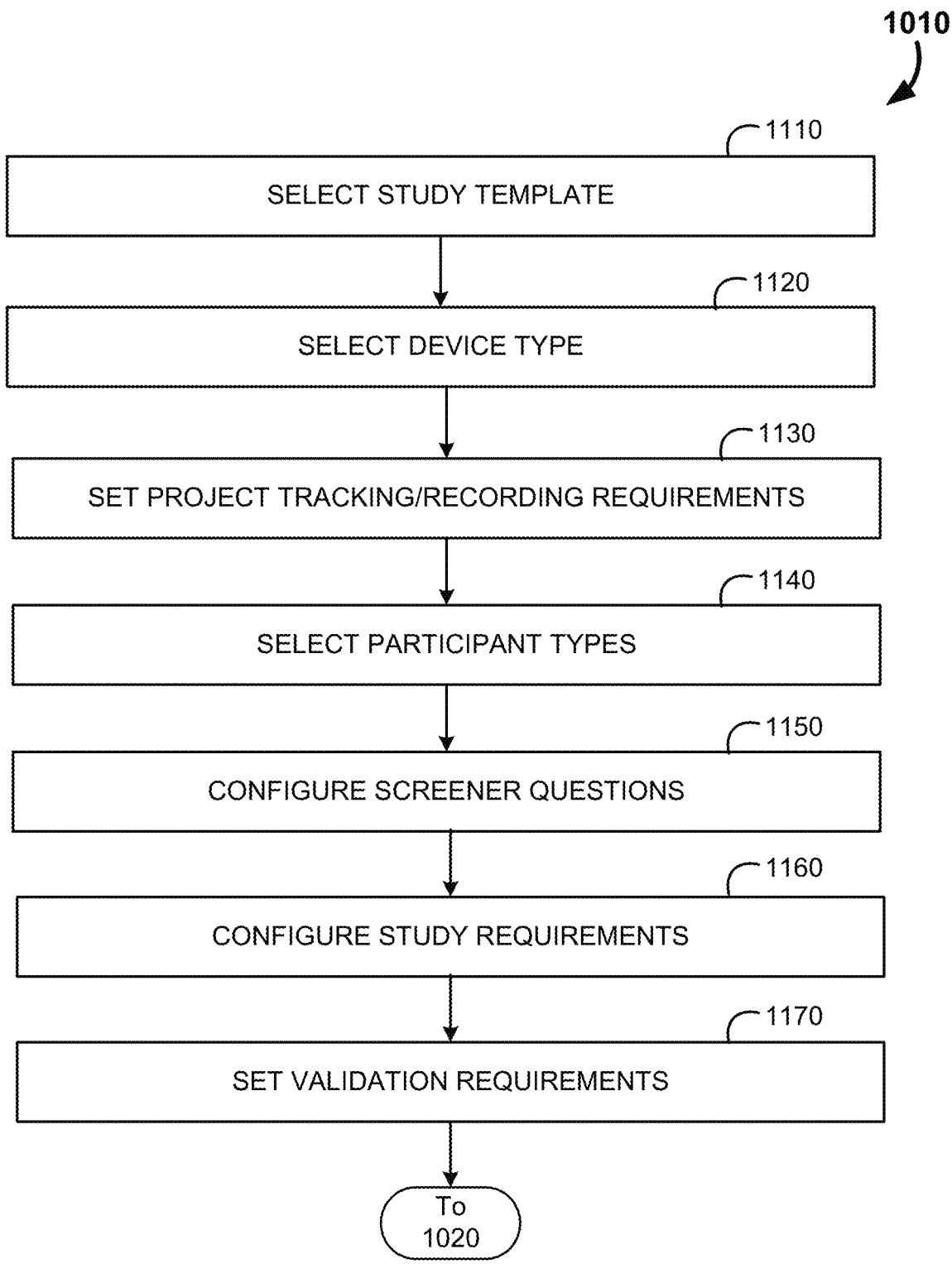
FIG. 11 is a flow diagram for the example process of study generation, in accordance with some embodiment.

FIG. 11 provides a more detailed flow diagram of the study generation 1010. As noted before, the present systems and methods allows for improved study generation by the usage of study templates which are selected (at 1110) based upon the device the study is to be implemented on, and the type of study that is being performed. Study templates may come in alternate languages as well, in some embodiments. Study types generally include basic usability testing, surveys, card sort, tree test, click test, live intercept and advanced user insight research. The basic usability test includes audio and/or video recordings for a relatively small number of participants with feedback. A survey, on the other hand, leverages large participant numbers with branched survey questions. Surveys may also include randomization and double blind studies. Card sort, as discussed in great detail previously, includes open or closed card sorting studies. Tree tests assess the ease in which an item is found in a website menu by measuring where users expect to locate specific information. This includes uploading a tree menu and presenting the participant with a task to find some item within the menu. The time taken to find the item, and rate of successful versus unsuccessful queries into different areas of the tree menu are collected as results.

Click test measures first impressions and defines success areas on a static image as a heat map graph. In the click test the participant is presented with a static image (this may include a mock layout of a website/screenshot of the webpage, an advertising image, an array of images or any other static image) and is presented a text prompt. The text prompt may include questions such "Which image makes you the hungriest?" or "select the tab where you think deals on televisions are found." The location and time the user clicks on the static image is recorded for the generation of a heat map. Clicks that take longer (indicating a degree of uncertainty on behalf of the participant) are weighted as less strong, whereas immediate selection indicates that the reaction by the participant is surer. Over time the selections of various participants may be collected. Where many participants select an answer to a particular prompt in the same place relatively rapidly there is a darker heat map indicator. Where participants select various locations, the heat map will show a more diffuse result. Consistent location, but longer delay in the selection will also result in a concentration on the heat map, but of a lighter color, indicating the degree of insecurity by the participants.

Additionally, the user may be able to define regions on the static image that are considered 'answers' to the prompted question. This may allow for larger scale collection of success versus failure metrics, as well as enabling follow-up activities, such as a survey or additional click test, based upon where the participant clicks on the image.

Lastly, advanced research includes a combination of the other methodologies with logical conditions and task validation, and is the subject of much of the below discussions. Each of these study types includes separate saved template designs.

Device type is selected next (at 1120). As noted before, mobile applications enable SDK integration for user experience interruption, when this study type is desired. Additionally, the device type is important for determining recording ability/camera capability (e.g., a mobile device will have a forward and reverse camera, whereas a laptop is likely to only have a single recording camera, whereas a desktop is not guaranteed to have any recording device) and the display type that is particularly well suited for the given device due to screen size constraints and the like.

The study tracking and recording requirements are likewise set (at 1130). Further, the participant types are selected (at 1140). The selection of participants may include a selection by the user to use their own participants, or rely upon the study system for providing qualifies participants. If the study system is providing the participants, a set of screener questions are generated (at 1150). These screener questions may be saved for later usage as a screener profile. The core participants and larger general panel participants may be screened until the study quota is filled.

Next the study requirements are set (at 1160). Study requirements may differ based upon the study type that was previously selected. For example, the study questions are set for a survey style study, or advanced research study. In basic usability studies and research studies the task may likewise be defined for the participants. For tree tests the information being sought is defined and the menu uploaded. For click test the static image is selected for usage. Lastly, the success validation is set (at 1170) for the advanced research study.

Figure 12:
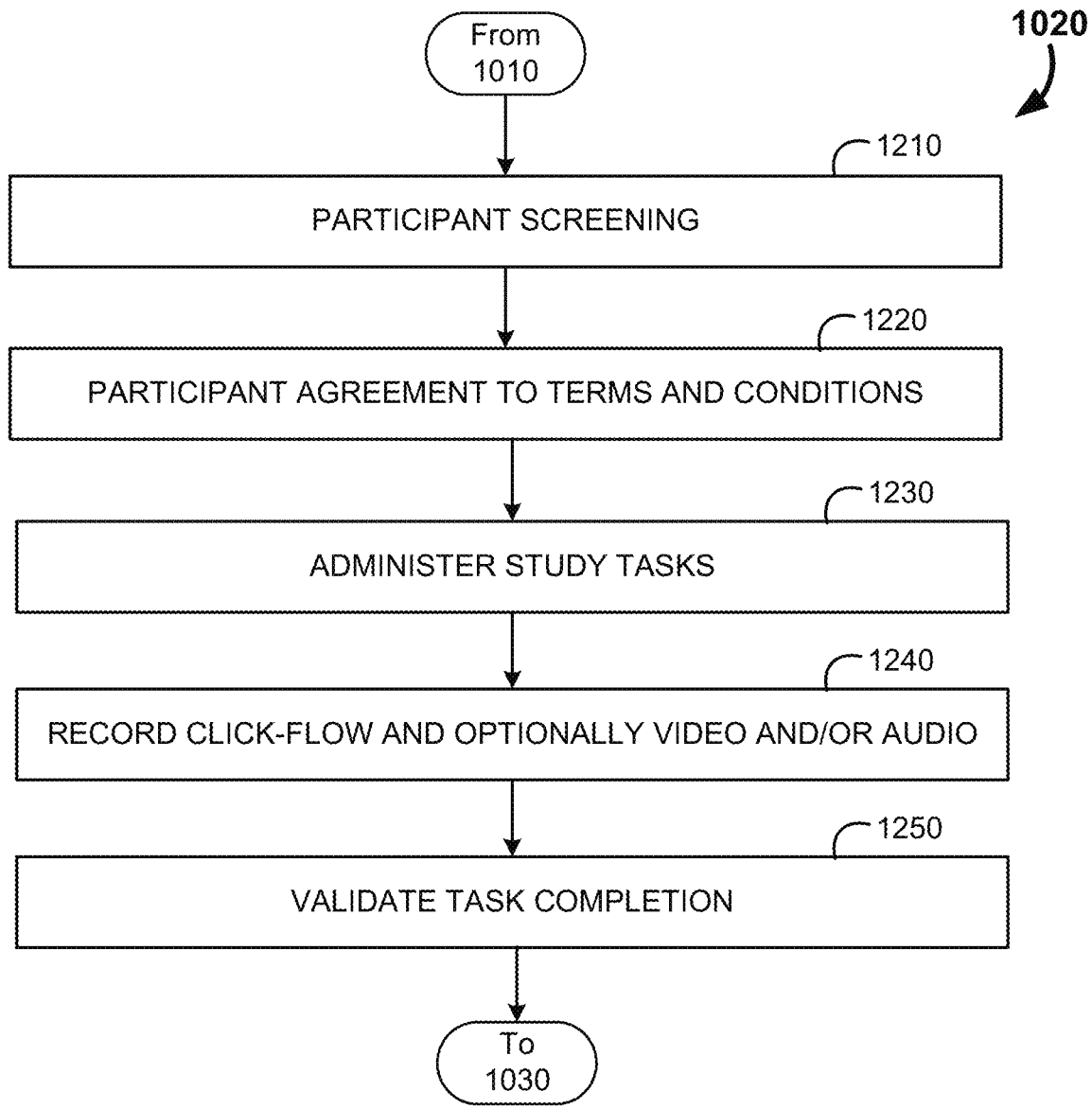
FIG. 12 is a flow diagram for the example process of study administration, in accordance with some embodiment.

After study generation, the study may be implemented, as shown in greater detail at 1020 of FIG. 12. Study implementation begins with screening of the participants (at 1210). This includes initially filtering all possible participants by known demographic or personal information to determine potentially eligible individuals. For example, basic demographic data such as age range, household income and gender may be known for all participants. Additional demographic data such as education level, political affiliation, geography, race, languages spoken, social network connections, etc. may be compiled over time and incorporated into embodiments, when desired. The screener profile may provide basic threshold requirements for these known demographics, allowing the system to immediately remove ineligible participants from the study. The remaining participants may be provided access to the study, or preferentially invited to the study, based upon participant workload, past performance, and study quota numbers. For example, a limited number (less than 30 participants) video recorded study that takes a long time (greater than 20 minutes) may be provided out on an invitation basis to only core panel participants with proven histories of engaging in these kinds of studies. In contrast, a large survey requiring a thousand participants that is expected to only take a few minutes may be offered to all eligible participants.

The initially eligible participants are then presented with the screener questions. This two-phased approach to participant screening ensures that participants are not presented with studies they would never be eligible for based upon their basic demographic data (reducing participant fatigue and frustration), but still enables the user to configure the studies to target a particular participant based upon very specific criteria (e.g., purchasing baby products in the past week for example).

After participants have been screened and are determined to still meet the study requirements, they are asked to accept the study terms and conditions (at 1220). As noted before, privacy regulations play an ever increasing role in online activity, particularly if the individual is being video recorded. Consent to such recordings is necessitated by these regulations, as well as being generally a best practice.

After conditions of the study are accepted, the participant may be presented with the study task (at 1230) which, again, depends directly upon the study type. This may include navigating a menu, finding a specific item, locating a URL, answering survey questions, providing an audio feedback, card sorting, clicking on a static image, or some combination thereof. Depending upon the tasks involved, the clickstream and optionally audio and/or video information may be recorded (at 1240). The task completion is likewise validated (at 1250) if the success criteria is met for the study. This may include task completion in a particular time, locating a specific URL, answering a question, or a combination thereof.

Figure 13:
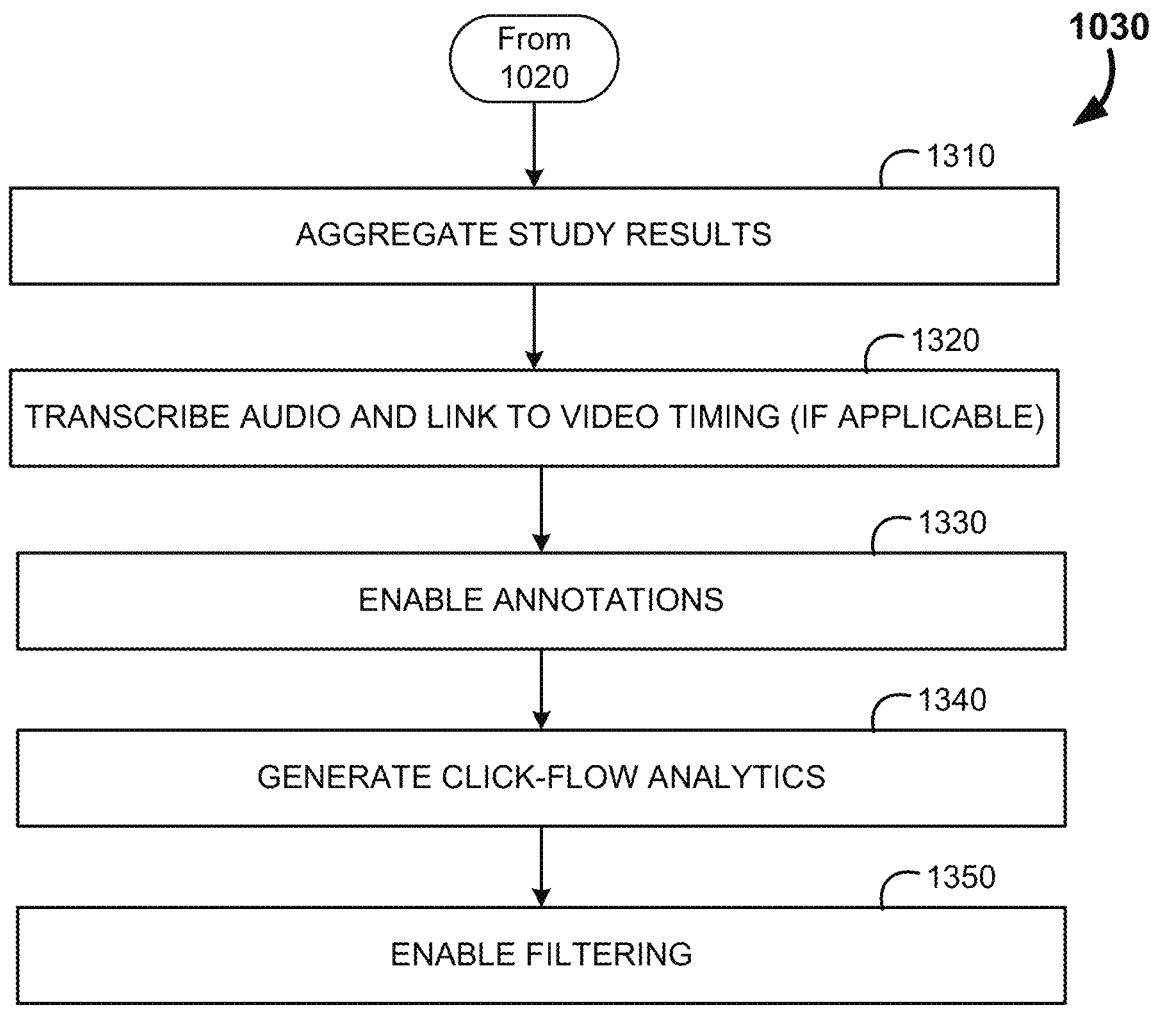
FIG. 13 is a flow diagram for the example process of insight generation, in accordance with some embodiment.

After study administration across the participant quota, insights are generated for the study based upon the results, as seen at 1030 of FIG. 13. Initially the study results are aggregated (at 1310). This includes graphing the number of studies that were successful, unsuccessful and those that were abandoned prior to completion. Confidence intervals may be calculated for these graphs. Similarly, survey question results may be aggregated and graphed. Clickstream data may be aggregated and the likelihood of any particular path may be presented in a branched graphical structure. Aggregation may include the totality of all results, and may be delineated by any dimension of the study.

When an audio or video recording has been collected for the study, these recordings may be transcribed using machine voice to text technology (at 1320). Transcription enables searching of the audio recordings by keywords. The transcriptions may be synchronized to the timing of the recording, thus when a portion of the transcription is searched, the recording will be set to the corresponding frames. This allows for easy review of the recording, and allows for automatic clip generation by selecting portions of the transcription to highlight and tag/annotate (at 1330). The corresponding video or audio clip is automatically edited that corresponds to this tag for easy retrieval. The clip can likewise be shared by a public URL for wider dissemination. Any portion of the results, such as survey results and clickstream graphs, may similarly be annotated for simplified review.

As noted, clickstream data is analyzed (at 1340). This may include the rendering of the clickstream graphical interface showing what various participants did at each stage of their task. As noted before, deep learning neural networks may consume these graphs to identify 'points of confusion' which are transition points that are predictive of a failed outcome.

All the results are filterable (at 1350) allowing for complex analysis across any study dimension. Here too, machine learning analysis may be employed, with every dimension of the study being a feature, to identify what elements (or combination thereof) are predictive of a particular outcome. This information may be employed to improve the design of subsequent website designs, menus, search results, and the like.

Although not illustrated, video recording also enables additional analysis not previously available, such as eye movement tracking and image analysis techniques. For example, a number of facial recognition tools are available for emotion detection. Key emotions such as anger, frustration, excitement and contentment may be particularly helpful in determining the user's experience. A user who exhibits frustration with a task, yet still completes the study task may warrant review despite the successful completion. Results of these advanced machine learning techniques may be automatically annotated into the recording for search by a user during analysis.

While the above discussion has been focused upon testing the user experience in a website for data generation, it is also possible that these systems and methods are proactively deployed defensively against competitors who are themselves engaging in user experience analysis. This includes first identifying when a user experience test is being performed, and taking some reaction accordingly. Red-flag behaviors, such as redirection to the client's webpage from a competitive user experience analytics firm is one clear behavior. Others could include a pattern of unusual activity, such as a sudden increase in a very discrete activity for a short duration.

Once it is determined that a client's website has been targeted for some sort of user experience test, the event is logged. At a minimum this sort of information if helpful to the client in planning their own user experience tests, and understanding what their competitors are doing. However, in more extreme situations, alternate web portals may be employed to obfuscate the analysis being performed.

Turning now to FIGS. 14-24, 25A-25F, 26, 27A-27D, 28A-28B and 29, example screenshots of the operation of the user experience study system are provided. Particularly at FIG. 14, an initial study generation site is provided at 1400 which allows the user to select the type of study they wish to generate. The study types have been previously discussed in significant detail, and allow for template selection based upon the user input.

Figure 15:
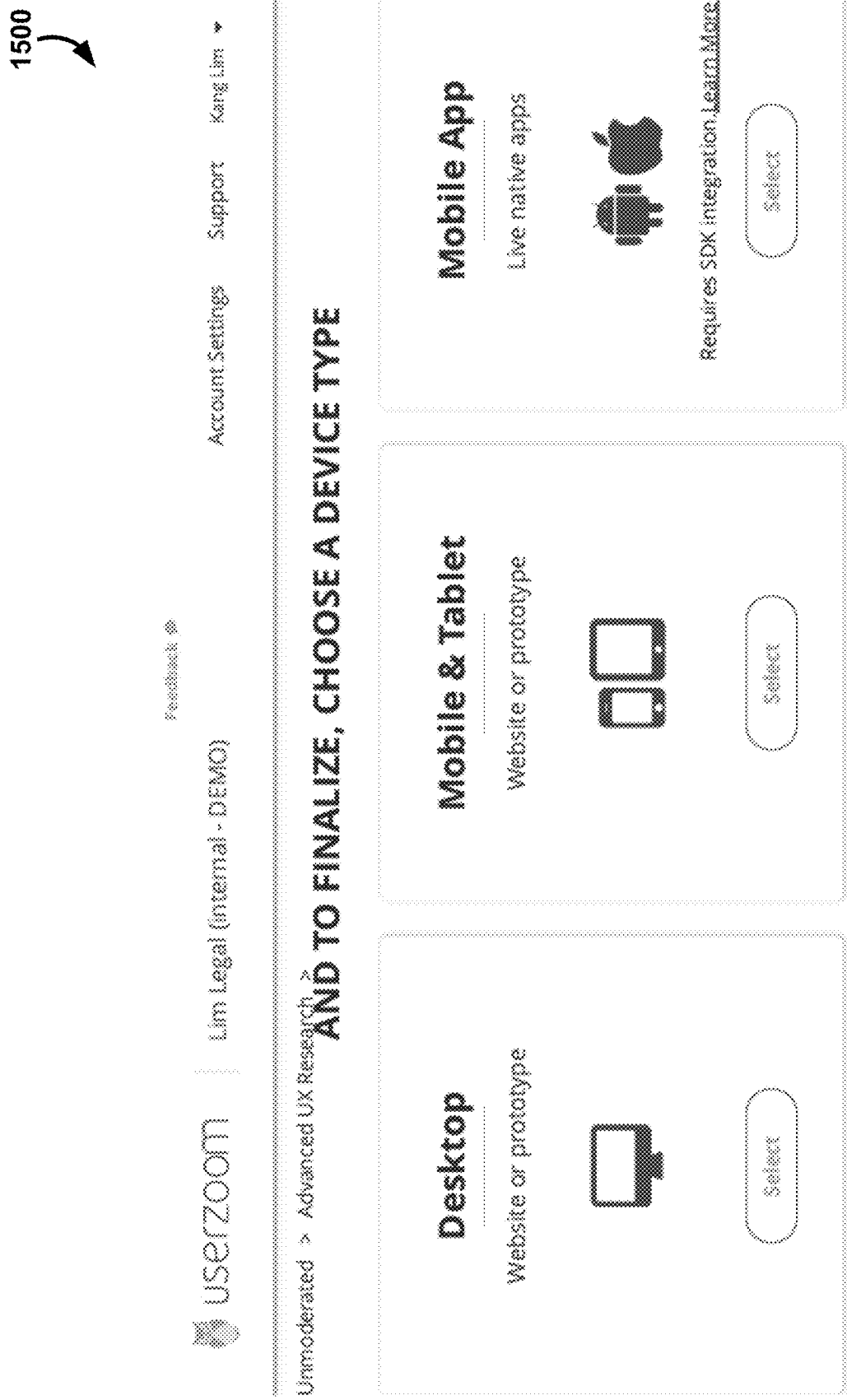
Figure 18:
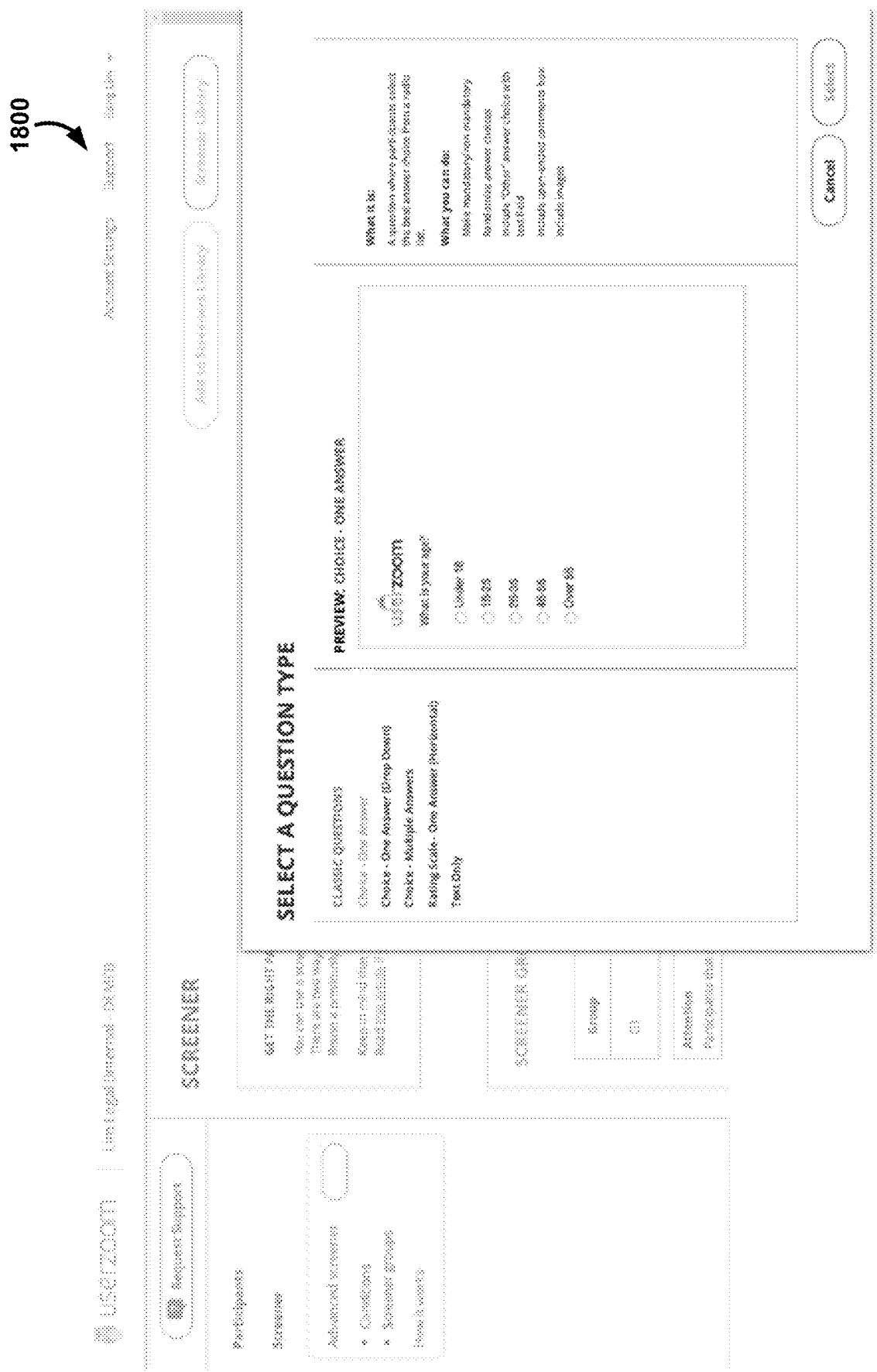

Upon selection of the study type, the user is presented with a screen to determine what device type the study will occur on, at 1500 of FIG. 15. The device type ensures that the study interface is properly adapted for the screen size and device capabilities. Additionally, if a mobile application is selected, the use of SDK integration enables user experience interruptions.

After the device type has been selected, the project/study details are requested from the user, at screen 1600 of FIG. 16. This includes assigning an internal and external name for the study, applying relevant labels, inputting notes and other information regarding the goals of the study, and selecting the recording level desired and the participant language. A requirement for consent is also available based upon the jurisdiction the study is deployed in and/or the level of data collected.

After the study is thus created, the participant selection screen 1700 is presented to the user, as seen in FIG. 17. Generally the options are for the user to supply their own participant pool, or utilize the pool of participants available to the user experience system. Again, this pool of participants includes the core panel as well as the general panel of participants.

On the left side of the screen it can be seen that a screen navigation link is available. If selected, the user is redirected to a screener interface, seen at 1800 of FIG. 18. On the screener interface the user may select questions used to screen potential participants. The questions available include single answer (radial button) answers, drop down single answer questions, multiple answer questions (check box), rating scaled questions, and text answer questions. An example of the generation of a one answer question is provided in relation to the interface 1900 of FIG. 19. The user inputs the question text and possible answers. Randomization events may be selected for the answers to avoid errors associated with answer patterns. The logical result of the answer selection allows for early termination, or branched question sequences.

Figure 20:
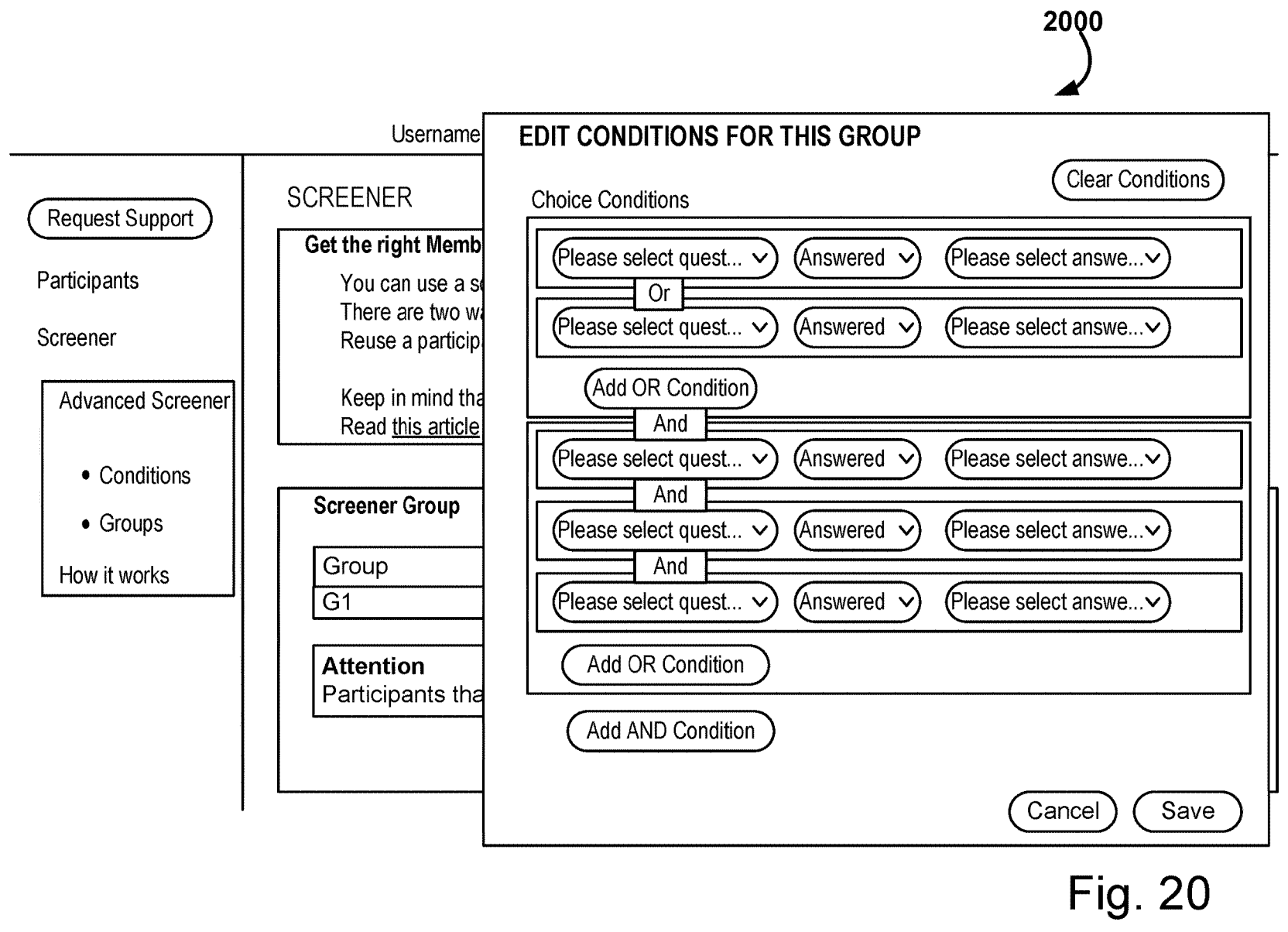

After the question(s) are generated, they may be linked together in logical conditions in order to produce a screener group, as seen in interface 2000 of FIG. 20. This allows for the questions to be arranged in "or" and "and" clusters.

Figure 21:
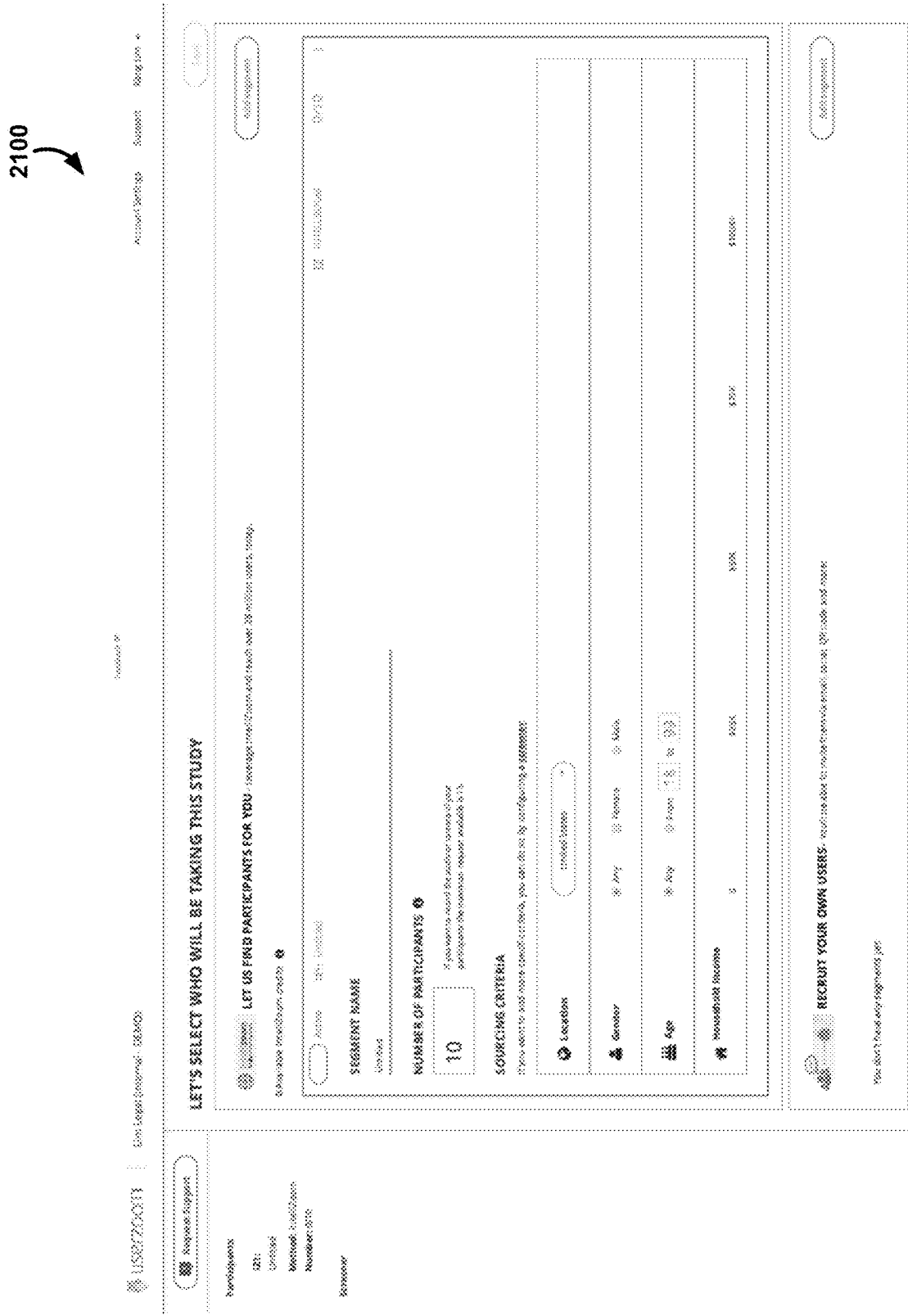

When the system is providing the participants, the user is still requested to provide information regarding segments that they wish to be included in the study, as seen in FIG. 21 at interface 2100. The segment is provided a name and a number of desired participants. Additionally, basic data such as location, gender, age and household income may be set to ensure that only eligible participants are presented with the study (or invited to join the study). This interface 2100 is simpler than the more invasive screener questions, and is generally employed in the alternative, when a faster and less involved participant list is needed (multiple participant groups are not generated in this embodiment).

After the participants are determined, the user configures the actual tasks or questions involved in the study, as seen in the interface 2200 of FIG. 22. The tasks may include navigation tasks (either created from scratch or imported from this or a previous study), as seen, or may include any of the other tasks noted previously by pulling down on the drop-down menu. Other tasks may include click tests, card sorts, surveys, etc. This interface additionally allows the user to indicate the order of the tasks.

Figure 23:
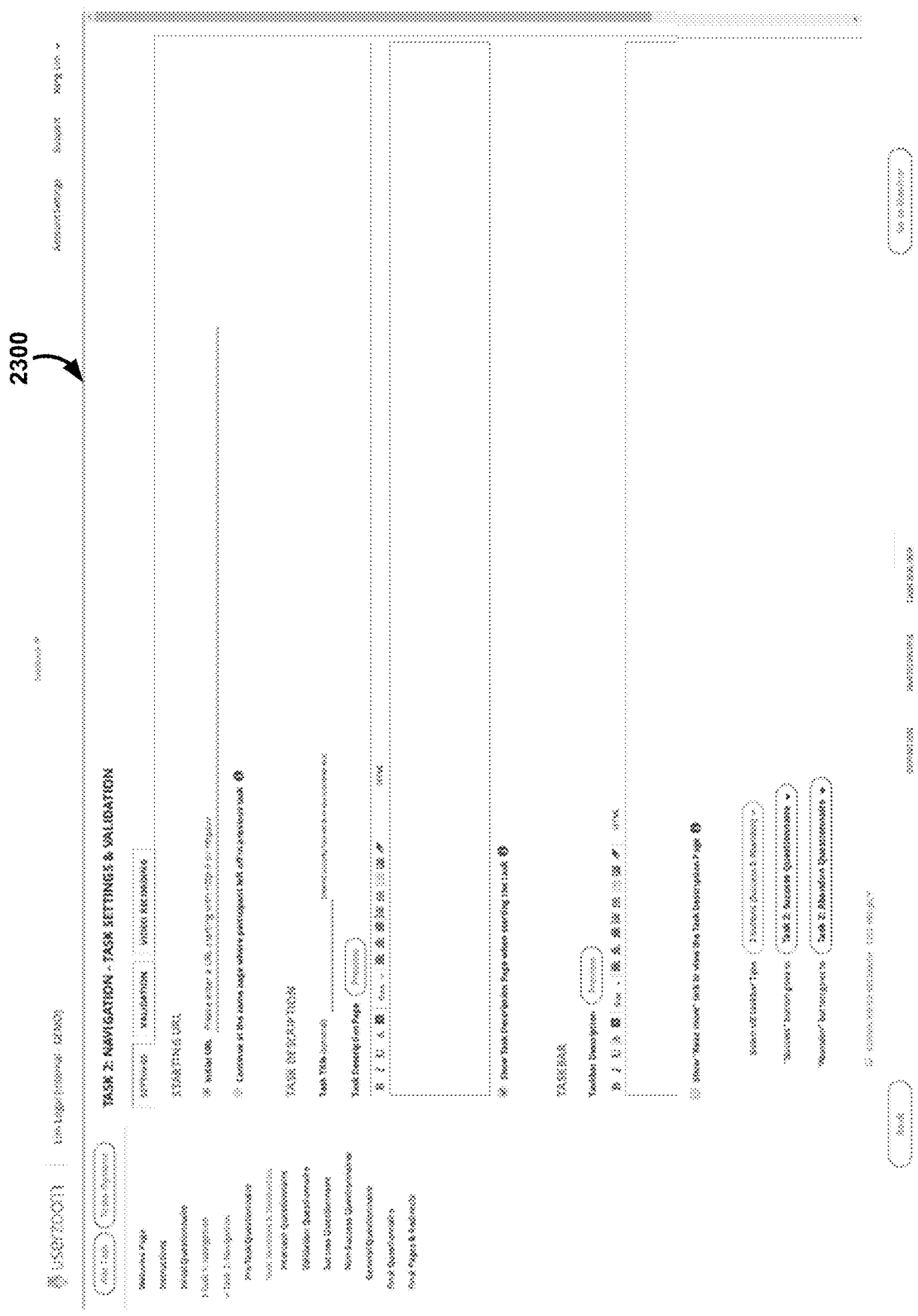
Figure 25B:
Figure 25C:
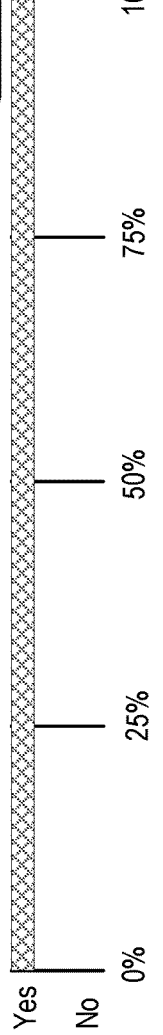
Figure 25E:
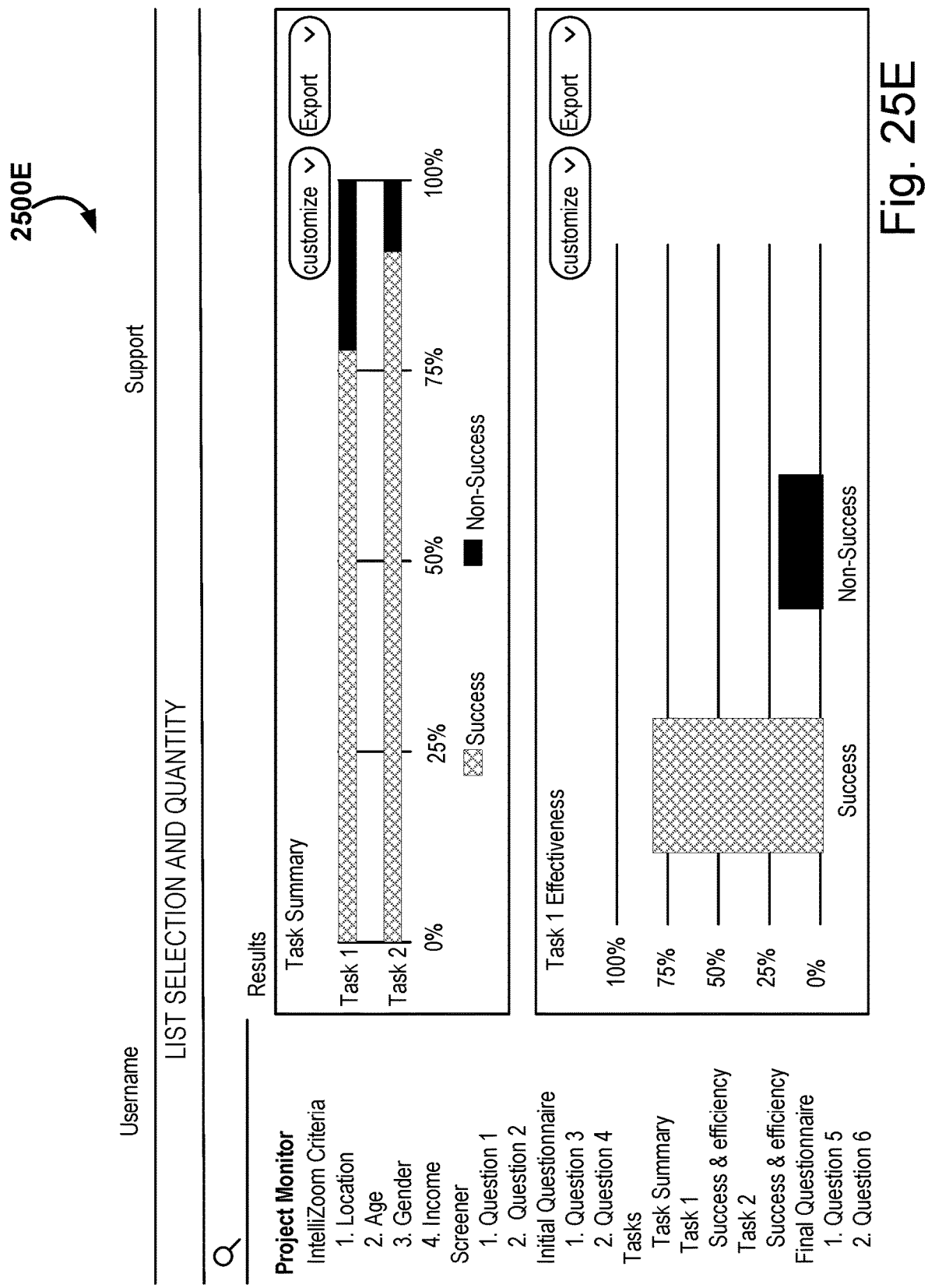
Figure 25F:
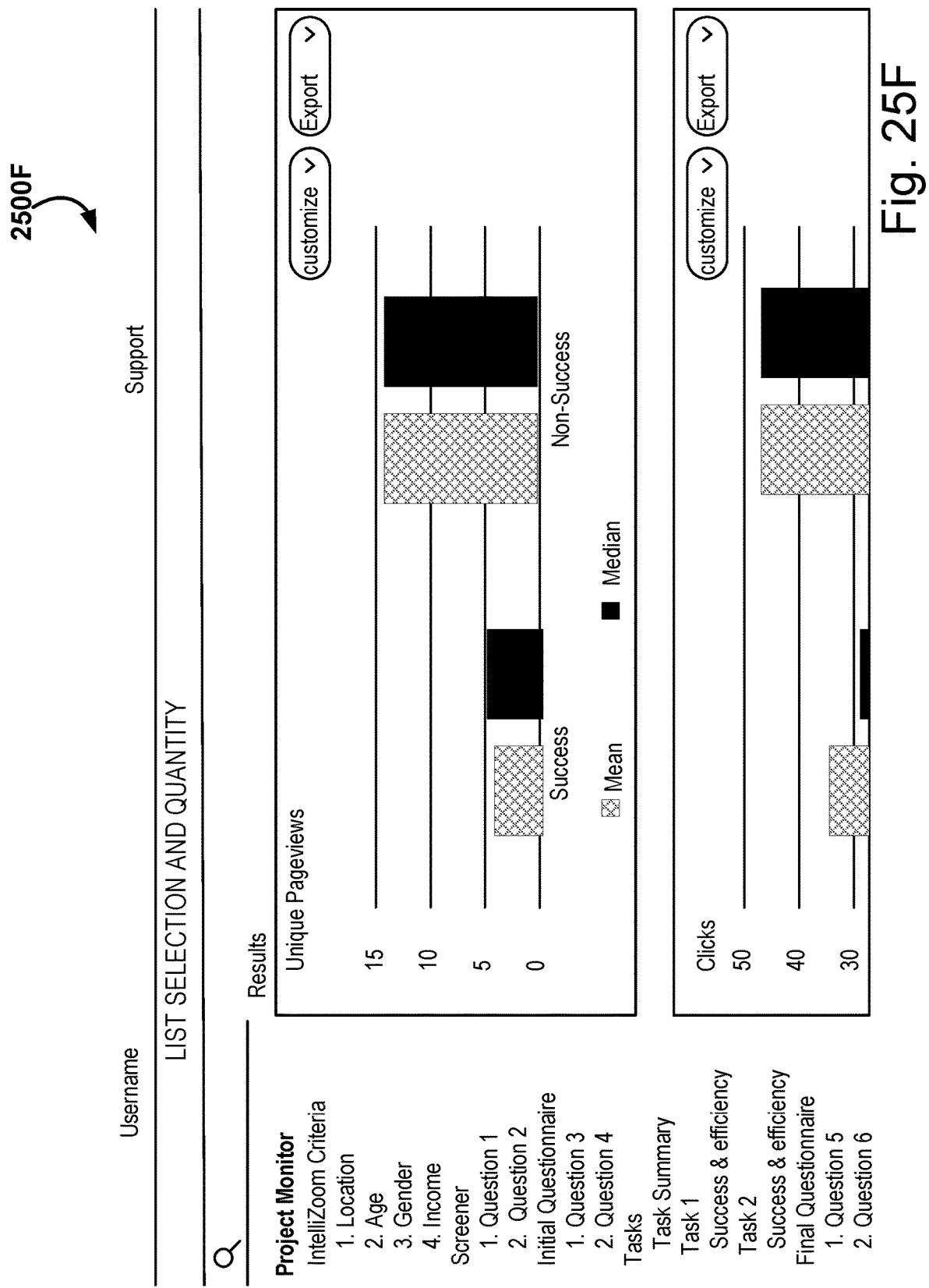

After the task is created, it is configured via a task configuration interface 2300 of FIG. 23. For a navigation task as seen, this may include putting the participant at an initialization URL, or merely beginning from a webpage the participant was at in the previous step. The task is titled and described. For example, the task may state "find and update your contact information." A taskbar description is also described, and can include a success and abandonment selection option. In alternate embodiments, the taskbar may instead only include abandonment as an option, and success is defined by successfully completing the validation requirements. At the top of the interface, the user has access to a validation tab for configuring validation requirements, and a recording tab, where video recording options are set.

After all the tasks are set in this manner the study may be launched and made available to participants for testing. The results of the testing are compiled in a monitoring interface as seen at 2400 of FIG. 24. This interface shown the number of participants initially involved. In this case an original number of 24 participants were invited for the study. Of the 24, seven were excluded from the study due to not meeting the screener question requirements. An additional two individuals exited the study (abandoned it) within the welcome screen. The remaining 15 participants completed the study.

Turning now to FIGS. 25A-25F, details of the study results are provided in more detail. For example, as seen at 2500A of FIG. 25A, it can be seen that all 15 of the participants came from a single participant segment. Other information, such as location of the participants are seen, as well as age, gender and household income levels (at 2500B of FIG. 25B). Results from the screener questions are also presented, as seen in 2500C of FIG. 25C. After screener question results, the initial questionnaire results are presented, as seen at 2500D of FIG. 25D.

Next, results of task completion are presented. Here is can be seen at 2500E of FIG. 25E that two tasks were presented to the participants, and that 13 of the participants were able to successfully complete the first task, and 14 were able to complete the second task. Each task is then analyzed in greater detail, including effectiveness, and as seen at 2500F of FIG. 25F, the number of page views, number of clicks required, and (not shown) timing for task completion are likewise presented. In some cases, these results may be provided with confidence intervals that predict what 95% of individuals who are presented the task will fall within.

In this example, it is clear that the participants that were unable to successfully complete this task were sidetracked and ended up lost in the website, clicking on page after page without finding what they were looking for. The click flow graph (not illustrated) may be leveraged by the user to determine at what stage the participants that were unsuccessful derailed from the successful pathway(s). The timing of these flows may then be used to review the video recordings for the participants to better understand what "went wrong" in their experience. FIG. 26 provides an example screenshot of a review pane 2600 for the video clips. The left side navigation menu illustrates how the videos can be filtered by tasks, marks, effectiveness, camera options, audio options, ones that have been viewed (or not), video that have been clipped and availability.

Figure 27B:
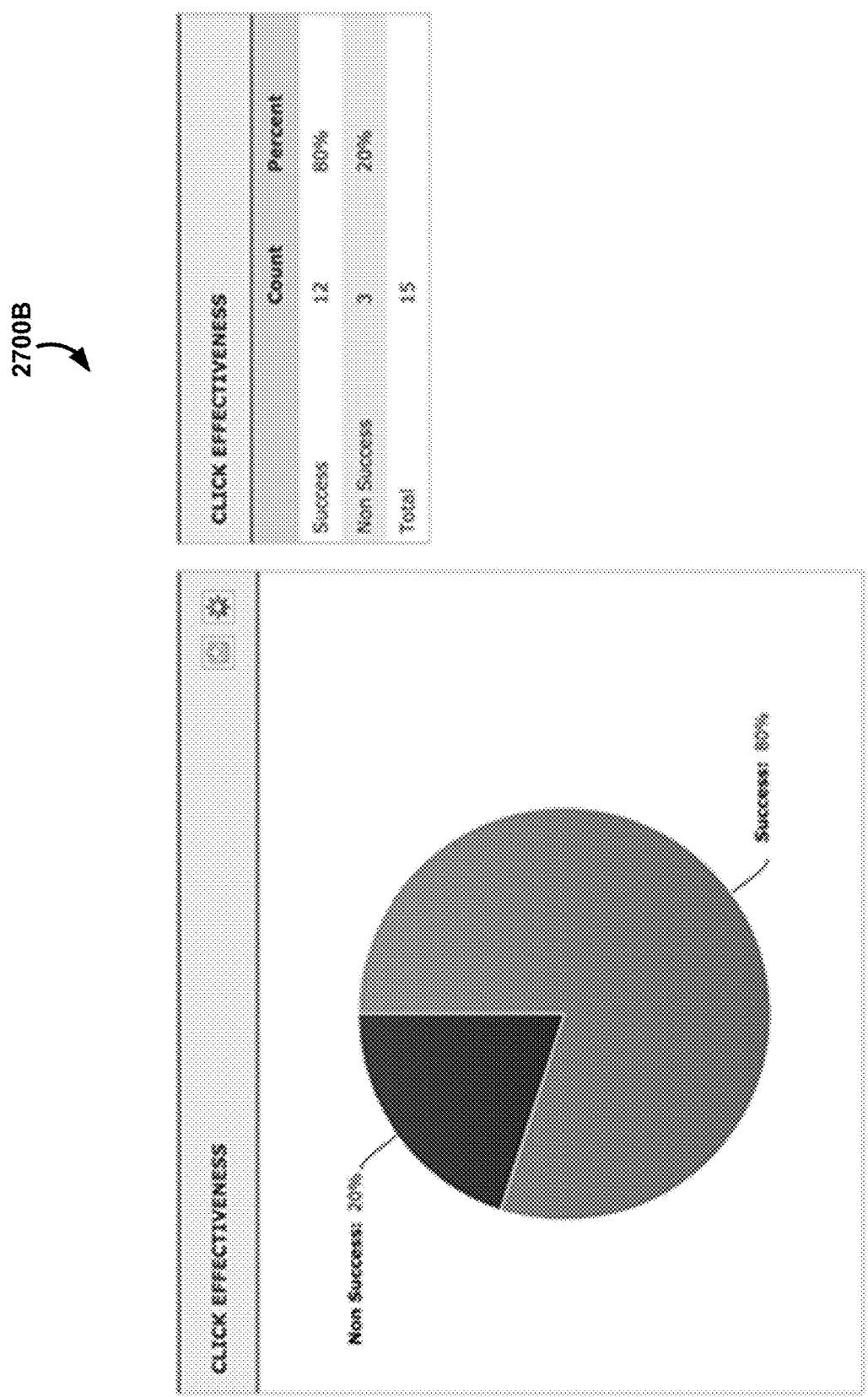

FIG. 27A provides an example screenshot 2700A of a first heat map generated for a webpage screenshot image using a click test. In this example, the participants were given a prompt of "Where would you click to get keychains?" In this first heat map only the click locations are illustrated. In this example, the user defined the "keychain" hyperlink as a successful 'answer' to the prompt/question. The results from the click test can thus be collected and illustrated in a simple metrics interface as seen in image 2700B of FIG. 27B. Here is can be seen that 12 of the 15 participants selected the correct link, whereas 3 participants clicked at some other location.

Figure 27D:

FIGS. 27C and 27D provide additional heat map interfaces that capture not only click locations, but also speed of the clicks, as seen at images 2700C and 2700D, respectively. The screenshot of 2700D is a blackout heat map which accentuates the click locations for user visibility.

Figure 28A:

Moving on, FIG. 28A provides a screenshot 2800A of a user uploading a tree structure menu into the system for a tree test. The user is then prompted, when shown only the top level of the tree, to find a particular item in the tree structure. In one example tree test the participants are requested to find olive oil. The results of this click test may be seen in relation to FIG. 28B at screenshot 2800B. Here it can be seen, both in terms of percentages and raw numbers of participants, where people looked for the product 'olive oil'. The majority of participants rightfully went to the 'ingredients' category and then to 'oils'. However, a sizable group of participants mistakenly selected 'condiments and sauces' and then 'olives' instead. This provides insights into potential locations for redirection, cross advertising of products, or in the extreme updating the way the tree structure is laid out.

Figure 29:
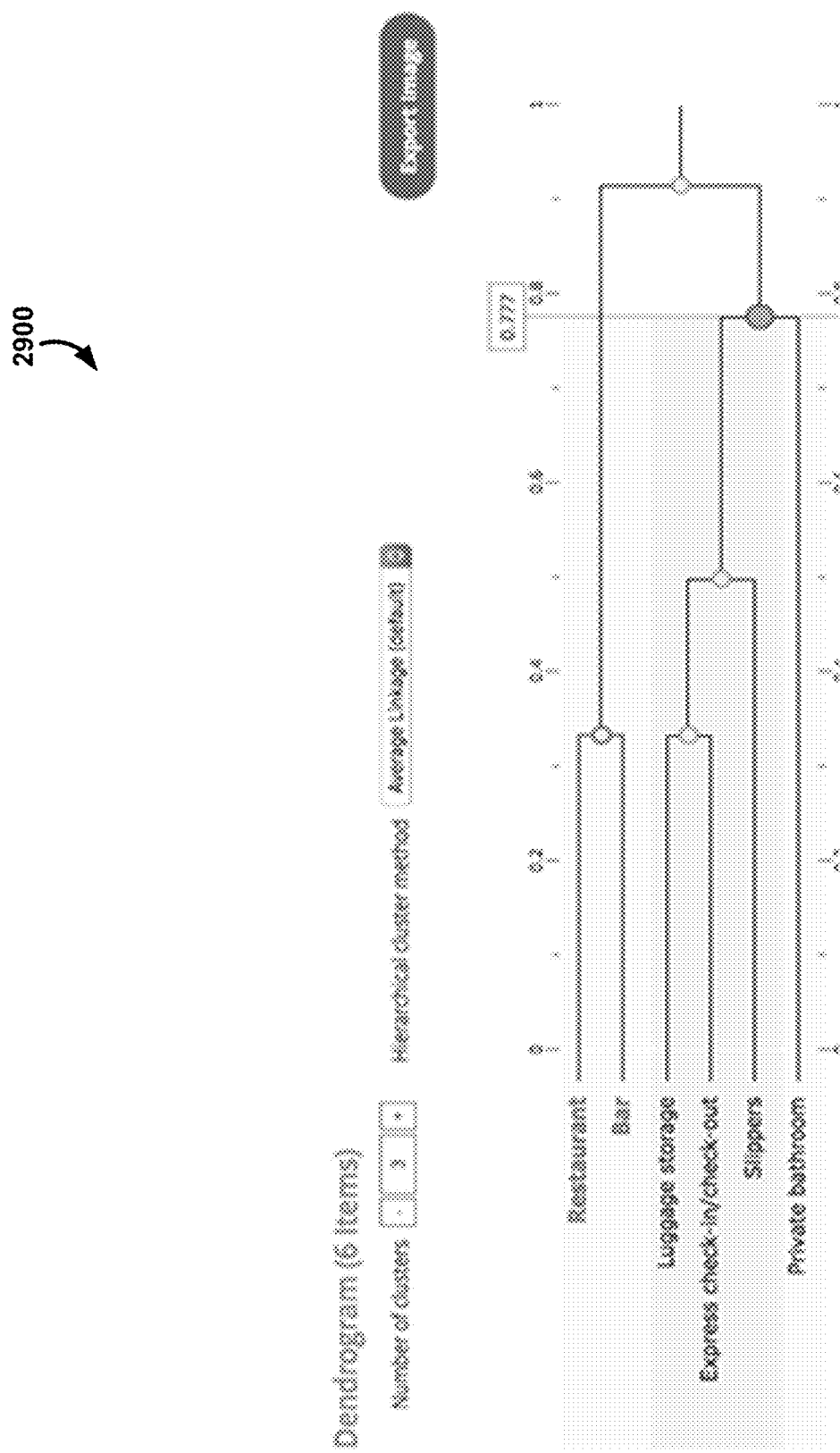

Lastly, FIG. 29 provides an example screenshot of a dendrogram 2900 from a card sorting or tree test activity. Dendrograms provide results in a tree structure that allows for selection of a node within the decision process to determine what portion of total participants falls below the selected node. In this example 77.7% of participants selected luggage storage, express check in, slippers and private bathrooms during the card sort involved in this example.

Some portions of the above detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other apparatus. Various general-purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a virtual machine, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer, and when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A method for generating selecting participants for a user experience study comprising:
   receiving a set of criteria from a third party;
   accessing more than one pool of available participants, each participant associated with a profile;
   filtering the available participants by system requirements to generate a first set of eligible participants;
   filtering the first set of eligible participants by the set of criteria using the profile to generate filtered participants;
   offering the filtered participants an opportunity to engage in a usability study;
   receiving a set of interested participants who wish to engage in the usability study, where the usability study has an expected length;
   refining the set of interested participants by asking questions regarding the set of criteria not found in the profile associated with the given participant from the set of interested participants to identify eligible participants;
   eliminating from the eligible participants individuals that fit a quota which is already met to yield a final set of participants, wherein the final set of participants include core participants and general participants based upon their respective profiles; and
   offering compensation, on a variable scale, based upon the participant being a core participant or a general participant, the set of criteria, and the expected length of the usability study.

2. The method of claim 1, wherein the accessing more than one pool of available participants includes recruitment via email, advertisement banner, pop-up, text layers, and overlays.

3. The method of claim 1, wherein the system requirements include the usage of a specific web browser.

4. The method of claim 1, wherein the profile is collected by presenting a set of questions to the available participant.

5. The method of claim 4, wherein the questions include participants' experience with certain products, their awareness with certain brand names, their gender, age, education level, income, and online buying habits.

6. The method of claim 1, further comprising receiving an acceptance from a subset of the eligible participants to generate final participants.

7. The method of claim 6, further comprising assigning a task to the final participants.

8. The method of claim 7, wherein the task includes determining if a tracking code is embedded in a target website.

9. The method of claim 8, wherein when the tracking code is not embedded in the target website, inserting the tracking code into the final participant's web browser.

10. The method of claim 9, wherein the tracking code is a JavaScript code that pop-ups a series of steps in the task to the final participants.

11. A computer program product stored on a non-transitory memory, which when executed by a computer system performs the steps of:
    receiving a set of criteria from a third party;
    accessing more than one pool of available participants, each participant associated with a profile;
    filtering the available participants by system requirements to generate a first set of eligible participants;
    filtering the first set of eligible participants by the set of criteria using the profile to generate filtered participants;
    offering the filtered participants an opportunity to engage in a usability study;
    receiving a set of interested participants who wish to engage in the usability study, where the usability study has an expected length;
    refining the set of interested participants by asking questions regarding the set of criteria not found in the profile associated with the given participant from the set of interested participants to identify eligible participants;
    eliminating from the eligible participants individuals that fit a quota which is already met to yield a final set of participants, wherein the final set of participants include core participants and general participants based upon their respective profiles; and
    offering compensation, on a variable scale, based upon the participant being a core participant or a general participant, the set of criteria, and the expected length of the usability study.

12. The computer program product of claim 11, wherein the accessing more than one pool of available participants includes recruitment via email, advertisement banner, pop-up, text layers, and overlays.

13. The computer program product of claim 11, wherein the system requirements include the usage of a specific web browser.

14. The computer program product of claim 11, wherein the profile is collected by presenting a set of questions to the available participant.

15. The computer program product of claim 14, wherein the questions include participants' experience with certain products, their awareness with certain brand names, their gender, age, education level, income, and online buying habits.

16. The computer program product of claim 11, which when executed by the computer system further performs the step of receiving an acceptance from a subset of the eligible participants to generate final participants.

17. The computer program product of claim 16, which when executed by the computer system further performs the step of assigning a task to the final participants.

18. The computer program product of claim 17, wherein the task includes determining if a tracking code is embedded in a target website.

19. The computer program product of claim 18, wherein when the tracking code is not embedded in the target website, inserting the tracking code into the final participant's web browser.

20. The computer program product of claim 19, wherein the tracking code is a JavaScript code that pop-ups a series of steps in the task to the final participants.

* * * * *